United States Patent
Cameron et al.

(10) Patent No.: US 8,170,933 B1
(45) Date of Patent: May 1, 2012

(54) METHOD AND SYSTEM FOR PROVIDING A CUSTOMIZED START-UP BUDGET FOR A NEW BUSINESS

(75) Inventors: Robert Grant Cameron, San Francisco, CA (US); Amy Melissa Kerman, San Francisco, CA (US); Stephen Nguyen, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 249 days.

(21) Appl. No.: 12/712,478

(22) Filed: Feb. 25, 2010

(51) Int. Cl.
*G07B 17/00* (2006.01)
*G06Q 10/00* (2012.01)

(52) U.S. Cl. .......................... 705/30; 705/7.11

(58) Field of Classification Search .................. None
See application file for complete search history.

(56) References Cited

U.S. PATENT DOCUMENTS

| | | | | |
|---|---|---|---|---|
| 6,067,525 | A * | 5/2000 | Johnson et al. ............... | 705/7.13 |
| 6,401,091 | B1 * | 6/2002 | Butler et al. ............... | 1/1 |
| 6,687,713 | B2 * | 2/2004 | Mattson et al. ............... | 709/219 |
| 7,130,822 | B1 * | 10/2006 | Their et al. ............... | 705/35 |
| 7,640,179 | B1 * | 12/2009 | Sachedina ............... | 705/7.31 |
| 7,930,195 | B2 * | 4/2011 | Heyns et al. ............... | 705/7.11 |
| 2001/0056507 | A1 * | 12/2001 | Bartkowiak et al. ............. | 709/318 |
| 2002/0198755 | A1 * | 12/2002 | Birkner et al. ............. | 705/8 |
| 2003/0018510 | A1 * | 1/2003 | Sanches ............. | 705/9 |
| 2003/0033586 | A1 * | 2/2003 | Lawler ............. | 717/101 |
| 2003/0069716 | A1 * | 4/2003 | Martinez ............. | 702/188 |
| 2003/0074211 | A1 * | 4/2003 | Lun ............. | 705/1 |
| 2004/0073441 | A1 * | 4/2004 | Heyns et al. ............. | 705/1 |
| 2004/0073442 | A1 * | 4/2004 | Heyns et al. ............. | 705/1 |
| 2004/0073467 | A1 * | 4/2004 | Heyns et al. ............. | 705/7 |
| 2004/0073477 | A1 * | 4/2004 | Heyns et al. ............. | 705/10 |
| 2006/0015475 | A1 * | 1/2006 | Birkner et al. ............. | 707/1 |
| 2006/0025971 | A1 * | 2/2006 | Detwiler et al. ............. | 703/1 |
| 2009/0006291 | A1 * | 1/2009 | Detwiler et al. ............. | 706/19 |
| 2009/0327015 | A1 * | 12/2009 | Heyns et al. ............. | 705/8 |
| 2010/0211512 | A1 * | 8/2010 | Detwiler et al. ............. | 705/315 |
| 2011/0173050 | A1 * | 7/2011 | Heyns et al. ............. | 705/7.37 |

\* cited by examiner

*Primary Examiner* — Mussa A Shaawat
(74) *Attorney, Agent, or Firm* — McKay and Hodgson LLP; Philip J. McKay; Sean P. Lewis

(57) ABSTRACT

A method and system for providing a customized start-up budget for a new business leverages actual business start-up data associated with one or more actual businesses in one or more locations collected by various financial management systems to provide a customized start-up budget for a new business that includes a listing of the business start-up budget categories and/or business start-up budget sub-categories associated with starting up a proposed business in a particular area and the average, or otherwise weighted, amounts spent in each of the business start-up budget categories and/or business start-up budget.

36 Claims, 9 Drawing Sheets

METHOD AND SYSTEM FOR PROVIDING A CUSTOMIZED START-UP BUDGET FOR A NEW BUSINESS

BACKGROUND

It is estimated that within the next year 650,000 new small businesses will be started. It is further estimated that 220,000, or 34%, of those new small businesses will fail within two years of their start date and that 400,000, or 62%, will fail within five years of starting.

One factor contributing to this rather sobering failure rate for small businesses is that many small business owners fail to obtain the data necessary to create realistic start-up budgets, and therefore begin the business venture by: being under funded for the actual start-up costs associated with the business; spending too much, or, in some cases, too little, start-up money overall; spending too much, or too little, start-up money in one or more budget categories; not knowing what the budget categories are; or generally having little, or no, idea of what the real cost of starting up the business will be.

Currently, the fact that many small business owners fail to obtain the data necessary to create realistic start-up budgets is relatively understandable. This is because the business start-up budget data is often not available at all, or if the data is available, it is often highly generalized, and therefore of limited value, and it requires considerable time and/or other resources to obtain and process the data into any meaningful result.

For instance, currently, a potential small business owner can track down some business start-up budget data through various public sources of data such as census data, better business bureau data, various chambers of commerce data, professional organization data, tax records, etc. However, this business start-up budget data often: is largely generalized and theoretical, i.e., is based on speculation and extrapolation rather than based on actual transactions involving actual businesses; is dated; is incomplete; includes data for both failed businesses and businesses that succeeded; and is highly regional in nature. Consequently, a potential small business owner can currently spend a significant amount of time and energy obtaining publically available business start-up budget data, which is often of limited value, for even a single potential business location. Of course, the problem is only further multiplied, often literally, if the potential small business owner is contemplating multiple potential business locations. In addition, there is no guarantee that, after expending the effort to obtain the publically available business start-up budget data, the potential small business owner will be able to identify the correct budget categories and amounts, and draw the correct conclusions, using the data.

In other instances, currently, a potential small business owner can hire a consultant to help estimate the start-up costs of a business. However, this is often a very expensive proposition and, in many cases, the consult still uses the types of publically available business start-up budget data discussed above that, as noted, often: is largely generalized and theoretical, i.e., is based on speculation and extrapolation rather than based on actual transactions involving actual businesses; is dated; is incomplete; includes data for both failed businesses and businesses that succeeded; and is highly regional in nature. Consequently, even in cases where the potential small business owner does pay the cost of a consultant, the consultant's base data, conclusions, and recommendations may, or may not, be particularly relevant to the potential small business and/or potential small business owner. In addition, consultant data is still often highly regional in nature so that a potential small business owner contemplating multiple potential locations may have to pay multiple consulting fees.

Currently, there are some tools, such as computing system implemented tools, which, will provide a potential small business owner with some indication of the cost categories of starting up a generalized business. However, these tools often provide only highly generalized categories applicable to multiple types of businesses and do not provide any real data at all, or any guidance. Consequently, these tools often provide merely a template of potential categories that must be filled in by the user with data obtained by the user. Consequently, these tools provide information that is often so generalized and theoretical that it is of little, or no, real value to the potential owner of a specific business.

In addition, currently, there are some tools, such as computing system implemented tools, which will provide a potential small business owner with some indication of the cost of starting up a business. However, once again, these tools often rely on business start-up budget data that: is largely generalized and theoretical, i.e., is based on speculation and extrapolation rather than based on actual transactions involving actual businesses; is dated; is incomplete; includes data for both failed businesses and businesses that succeeded; and is highly regional in nature. Consequently, these tools often provide data and recommendations that are so generalized and theoretical that they are of limited value to the potential business owner.

As a result of the situation above, currently, many potential small business owners, and current small business owners, have no simple, effective, and efficient mechanism for obtaining business start-up budget data that is relevant to their proposed business, or existing business, and is based on the actual expenditures and experience of actual owners of similar businesses in the desired location of the proposed business, or existing business. Without doubt, this situation contributes to the fact that significant amounts money, energy, and human resources, are expended, and arguably wasted, every day on the 62% of small businesses that will fail within five years of their start date.

SUMMARY

In accordance with one embodiment, a system and method for providing a customized start-up budget for a new business leverages data collected by various financial management systems to provide a customized start-up budget for a new business. In one embodiment actual business start-up data associated with one or more actual businesses in one or more locations is obtained by the process for providing a customized start-up budget for a new business by providing the process for providing a customized start-up budget for a new business access to data from one or more financial management systems, such as one or more small business financial management systems. In one embodiment, the actual business start-up data associated with one or more actual businesses is then stripped of any identifying data and categorized according to one or more attributes, or business profile parameters, associated with the contributing party/business. In one embodiment, the aggregated and/or processed actual business start-up data associated with one or more actual businesses in one or more locations is then stored in a business start-up data database. In one embodiment, a business profile parameter entry user interface is provided to the user that includes one or more data entry fields where a user is requested to enter one or more new business profile parameters associated with the proposed business. In one embodiment, the aggregated and/or processed actual business start-up data associated with one or more actual businesses in one or more locations stored in the business start-up data database is then searched, using the new business profile parameters entered by the user as search parameters, to try and identify one or more businesses in the business start-up data database that are similar to the proposed business. In one embodiment, one or more businesses in the business start-up data database that are similar to the proposed business are identified and actual business start-up data associated with one or more actual businesses identified as being are similar to the proposed business is obtained from the start-up data database. In one embodiment, the actual business start-up data associated with the one or more actual businesses identified as being similar to the proposed business is then used to identify one or more business start-up budget categories, and, in one embodiment, sub-categories. In addition, in one embodiment the average, or otherwise weighted, amounts spent in each of the start-up budget categories and/or sub-categories is also obtained and calculated. In one embodiment, the user is then provided with a customized start-up budget for the proposed new business that includes a listing of the start-up budget categories and/or sub-categories and the average, or otherwise weighted, amounts spent in each of the start-up budget categories and/or start-up budget sub-categories.

The system and method for providing a customized start-up budget for a new business, as discussed herein, leverages actual business start-up data associated with one or more actual businesses in one or more locations collected by various financial management systems to provide a customized start-up budget for a new business that includes a listing of the start-up budget categories and/or sub-categories associated with starting up a proposed business in a particular area and the average, or otherwise weighted, amounts spent in each of the start-up budget categories and/or start-up budget sub-categories. Consequently, using the system and method for providing a customized start-up budget for a new business, discussed herein, potential small business owners, and current small business owners, are provided a simple, effective, and efficient mechanism for obtaining business start-up budget data that is relevant to their proposed business, or existing business, and is based on the actual expenditures and experience of actual owners of similar businesses in the desired location of the proposed business, or existing business.

Figure 1:
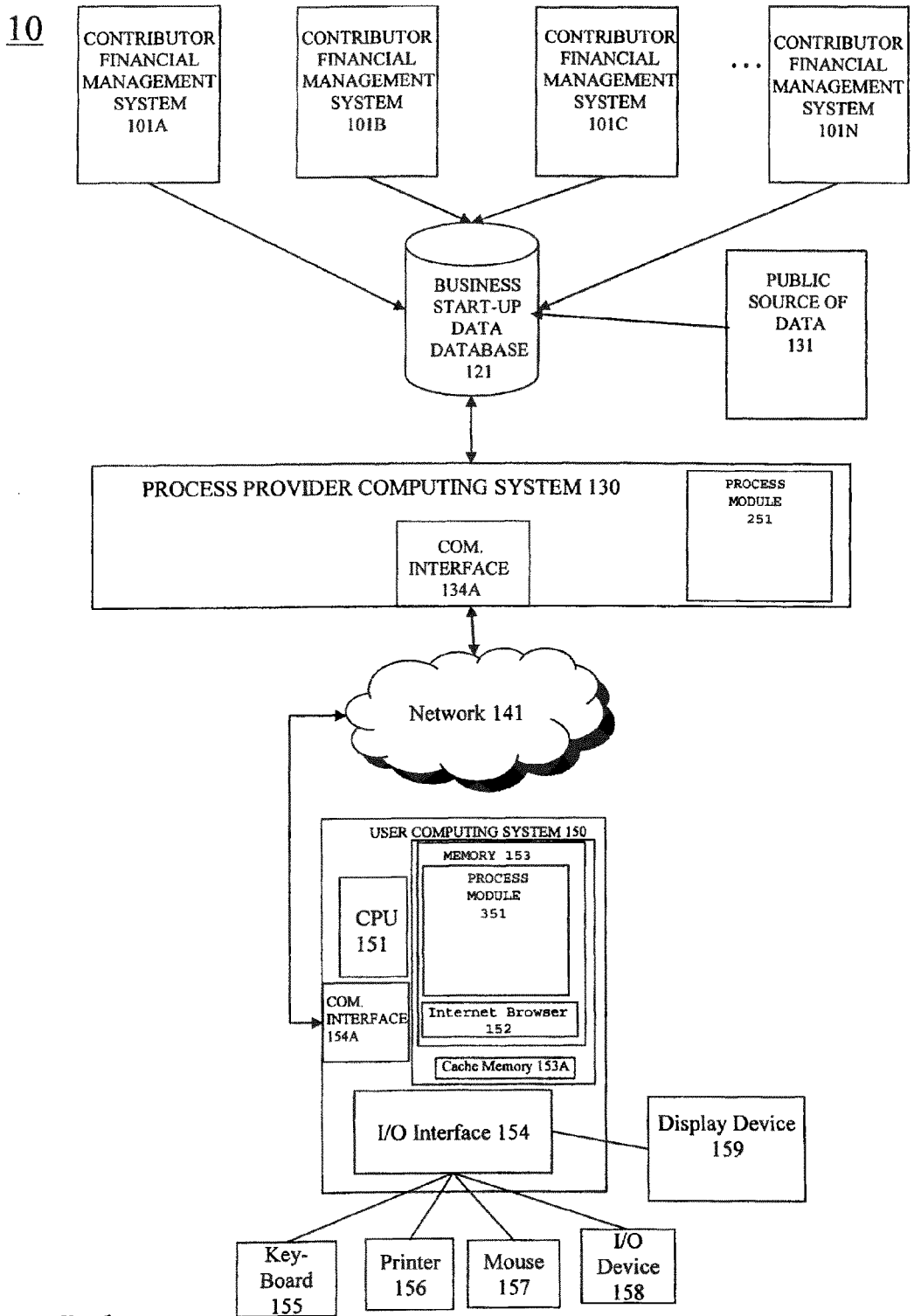
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In one embodiment, actual business start-up data associated with one or more actual businesses in one or more locations is obtained by the process for providing a customized start-up budget for a new business.

In one embodiment, access to actual business start-up data associated with one or more actual businesses in one or more locations is provided to the process for providing a customized start-up budget for a new business by providing the process for providing a customized start-up budget for a new business access to data from one or more financial management systems, such as one or more small business financial management systems.

As used herein, the term "financial management system" includes, but is not limited to: any computing system implemented, or web-based, data management system, package, program, module, or application that gathers financial data, including financial transactional data, or has the capability to analyze and categorize at least part of the financial data. Herein, a financial management system can be, but is not limited to, any of the following: an on-line, or web-based, or computing system implemented business financial management system, package, program, module, or application; an on-line, or web-based, or computing system implemented personal financial management system, package, program, module, or application; a n on-line, or web-based, or computing system implemented business inventory system, package, program, module, or application; an on-line, or web-based, or computing system implemented Point-Of-Sale (POS) system, package, program, module, or application an on-line, or web-based, or computing system implemented business asset management system, package, program, module, or application; an on-line, or web-based, or computing system implemented personal or business accounting system, package, program, module, or application; an on-line, or web-based, or computing system implemented personal or business tax preparation system, package, program, module, or application; an on-line, or web-based, or computing system implemented healthcare management system, package, program, module, or application; or any of the numerous an on-line, or web-based, or computing system implemented financial management systems discussed herein, or known to those of skill in the art at the time of filing, or as developed after the time of filing.

Specific examples of financial management systems include, but are not limited to: Quickbooks™, available from Intuit Inc. of Mountain View, Calif.; Quickbooks On-line™, available from Intuit Inc. of Mountain View, Calif.; Mint.com™, available from Intuit Inc. of Mountain View, Calif.; Microsoft Money™, available from Microsoft, Inc. of Redmond, Wash.; Quicken™, available from Intuit Inc. of Mountain View, Calif.; Quicken Online™, available from Intuit Inc. of Mountain View, Calif.; TurboTax™ available from Intuit Inc. of Mountain View, Calif.; or various other financial management systems discussed herein, or known to those of skill in the art at the time of filing, or as developed after the time of filing.

Financial management systems are typically software or web-based applications which, along with a computing system or device, help users/businesses manage their finances by providing a centralized interface with banks, credit card companies, asset account providers, mortgage companies, retirement account providers, vendors, government agencies, and other various financial and asset management institutions or accounts, for identifying, processing, storing, and categorizing data associated with user financial and/or business transactions. Financial management systems typically obtain financial and/or business transaction data, such as payee identification, payee location, payment amount, date of the transaction, time of transaction, etc., via communication with POS systems, accounting systems, inventory systems, banks, credit card providers, or other financial institutions, using data entry, links to databases, and electronic data transfer systems such as the Open Financial Exchange (OFX) specification or various systems for transferring financial transaction data.

Using financial management systems, the financial transaction data, payee identification, payee location, payment amount, date of the transaction, various tags or labels, and other data is often used by the financial management system to categorize or tag individual financial transactions as a particular type of income or expense, to generate various financial reports, and to create an overview of the business's financial situation based on input from multiple, and often all, available sources of financial information regarding a business/user. Some currently offered financial management systems then use this financial transaction data to track events, such as sales and purchase events, and to provide various historical personal and business data reports or displays including "to date" data reports, such as historical sales, inventory and spending data reports in one or more particular categories or tagging schemes, as well as year-end tax, or asset, or general financial reports.

In addition, some financial management systems provide a user/business with various budgeting capabilities, i.e., the capability to create and track spending in various categories and progress towards various budgeted amounts in various budget categories.

In one embodiment, access to actual business start-up data associated with one or more actual businesses in one or more locations is provided to the process for providing a customized start-up budget for a new business by providing the process for providing a customized start-up budget for a new business access to one or more actual business data databases created by and/or using data from one or more financial management systems. Many financial management systems, and, in particular, business financial data management systems include, and/or have access to, tax and cost of operations data associated with numerous businesses of various types, some of which would often share common attributes with the proposed business.

In one embodiment, access to actual business start-up data associated with one or more actual businesses in one or more locations is provided to the process for providing a customized start-up budget for a new business by providing the process for providing a customized start-up budget for a new business access to data from one or more financial management systems, such as one or more small business financial management systems, via a network, such as those discussed herein, and/or known in the art at the time of filing, and/or as developed after the time of filing.

In one embodiment, access to actual business start-up data associated with one or more actual businesses in one or more locations is provided to the process for providing a customized start-up budget for a new business by providing the process for providing a customized start-up budget for a new business access to data from one or more financial management systems, such as one or more small business financial management systems, via any other database, such as those discussed herein, and/or known in the art at the time of filing, and/or as developed after the time of filing.

In one embodiment, access to actual business start-up data associated with one or more actual businesses in one or more locations is provided to the process for providing a customized start-up budget for a new business by providing the process for providing a customized start-up budget for a new business access to data from one or more financial management systems, such as one or more small business financial management systems, via a computer program product, such as those discussed herein, and/or known in the art at the time of filing, and/or as developed after the time of filing.

In one embodiment, access to actual business start-up data associated with one or more actual businesses in one or more locations is provided to the process for providing a customized start-up budget for a new business by providing the process for providing a customized start-up budget for a new business access to data from one or more financial management systems, such as one or more small business financial management systems, using screen scrapping technology or a similar technology, such as those discussed herein, and/or known in the art at the time of filing, and/or as developed after the time of filing.

In one embodiment, access to actual business start-up data associated with one or more actual businesses in one or more locations is provided to the process for providing a customized start-up budget for a new business by providing the process for providing a customized start-up budget for a new business access to data from one or more financial management systems, such as one or more small business financial management systems, using any method, apparatus, process or mechanism for transferring data from one or more devices, computing systems, server systems, databases, web site/web functions or any devices having a data storage capability to one or more other devices, computing systems, server systems, databases, web site/web functions or any devices having a data storage capability, whether known at the time of filing or as thereafter developed.

In one embodiment, the actual business start-up data associated with one or more actual businesses in one or more locations is aggregated from, or through, one or more financial management systems, and the actual business start-up data is then stripped of any identifying data and categorized according to one or more attributes or business profile parameters associated with the contributing party/business. In one embodiment, this actual business start-up data is then capable of being searched based on one or more new business profile parameters. In one embodiment, the new business profile parameters are attributes associated with the proposed business and/or a location being sought. Therefore, this actual business start-up data can, according to one embodiment, provide a potential business owner with actual start-up costs, and operating costs, for one or more business similar to the proposed business operating in a given location/region under consideration.

In one embodiment, the aggregated and/or processed actual business start-up data associated with one or more actual businesses in one or more locations is then stored in a business start-up data database. As used herein, the term "database", such as used in the term "business start-up data database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, and/or accessible by, any computing system, as defined herein, known at the time of filing, or as developed thereafter.

In one embodiment, in addition to the aggregated and/or processed actual business start-up data associated with one or more actual businesses in one or more locations, business start-up data from one or more public sources of data such as census data, better business bureau data, various chambers of commerce data, professional organization data, tax records, etc. is also included in the business start-up data database.

In one embodiment, process for providing a customized start-up budget for a new business then generates a business profile parameter entry user interface and displays the business profile parameter entry user interface to the user on a display device associated with a user computing system that is under the control or, or accessible by, the user.

In one embodiment, the business profile parameter entry user interface includes one or more data entry fields where a user is requested to enter one or more business profile parameters associated with the proposed business. In one embodiment, the one or more business profile parameters associated with the proposed business can include, but are not limited to, any one or more of: the industry associated with the proposed business; a business category associated with proposed business; a business sub-category associated with the proposed business; the number of employees initially contemplated for the proposed business; expected tax and/or management structure of the proposed business, such as, but not limited to, S-corp, sole proprietorship, L.L.C., L.L.P., stock ownership, etc.; a zip code associated with the proposed business; a telephone area code associated with the proposed business; a telephone prefix associated with the proposed business; an actual address associated with the proposed business; a specific town, village or locality contemplated for the proposed business; a specific city and/or metropolitan region contemplated for the proposed business; specific counties and/or regions contemplated for the proposed business; specific states contemplated for the proposed business; specific countries contemplated for the proposed business; specific global regions, such as Europe or Asia contemplated for the proposed business; any other geographic region/location contemplated for the proposed business such as a specific GPS coordinate; and/or virtually any other business profile parameter desired by the provider of process for providing a customized start-up budget for a new business and/or one or more users of process for providing a customized start-up budget for a new business.

In one embodiment, one or more of the one or more business profile parameters associated with the proposed business requested through the business profile parameter entry user interface are selected by the provider of process for providing a customized start-up budget for a new business and are displayed to the user in the business profile parameter entry user interface. In one embodiment, the one or more business profile parameters are chosen by the provider of process for providing a customized start-up budget for a new business, however, the user can enter any real or hypothetical data as the one or more business profile parameters. For instance, in one embodiment, one of the one or more business profile parameters can be a zip code for the proposed business. As one illustrative example, the user can then enter multiple zip codes, typically one at a time, to run several hypothetical or real models for several hypothetical or real desired locations for the proposed business.

In one embodiment, one or more of the one or more business profile parameters associated with the proposed business requested through the business profile parameter entry user interface are selected by the provider of process for providing a customized start-up budget for a new business but the one or more business profile parameters can be added to, deleted, and/or modified by the user through the business profile parameter entry user interface. Then, as discussed above, the user can enter any real or hypothetical data as the one or more business profile parameters. For instance, in one embodiment, one of one or more business profile parameters can be a zip code for the proposed business. As one illustrative example, the user can then add the business profile parameter of telephone area code. Then, as one illustrative example, the user can enter multiple telephone area codes, typically one at a time, to run several hypothetical or real models for several hypothetical or real desired locations.

In one embodiment, the user then fills out, or otherwise enters data into to, the one or more data entry fields of the business profile parameter entry user interface. In one embodiment, the user fills out, or otherwise enters data into to, the one or more data entry fields of the business profile parameter entry user interface via a user interface device such as, but not limited to, a keyboard, mouse, voice recognition system, touch screen, touch pad, or any other device and/or mechanism capable of providing user input to a computing system, or for translating user actions into computing system operations, whether available or known at the time of filing or as developed later.

In one embodiment, once the user fills out, or otherwise enters data into to, the one or more data entry fields of the business profile parameter entry user interface, the aggregated and/or processed actual business start-up data associated with one or more actual businesses in one or more locations stored in the business start-up data database is searched, using the business profile parameters entered by the user as search parameters, to try and identify one or more businesses in the business start-up data database that are similar to the proposed business.

In one embodiment, once the user fills out, or otherwise enters data into to, the one or more data entry fields of the business profile parameter entry user interface the aggregated and/or processed actual business start-up data associated with one or more actual businesses in one or more locations stored in the business start-up data database is searched using the business profile parameters entered by the user to try and identify one or more businesses in the business start-up data database that are similar to the proposed business and are successful, i.e., are making a profit and/or are relatively new businesses.

In one embodiment, one or more businesses in the business start-up data database that are similar to the proposed business are identified and actual business start-up data associated with one or more actual businesses identified as being are similar to the proposed business is obtained from the start-up data database. In one embodiment, the actual business start-up data associated with one or more actual businesses identified as being similar to the proposed business is then used to identify one or more business start-up budget categories, and, in one embodiment, sub-categories. In addition, in one embodiment the average, or otherwise weighted, amounts spent in each of the start-up budget categories and/or sub-categories is also obtained and calculated.

In one embodiment, the user is then provided with a customized start-up budget for the proposed new business that includes a listing of the start-up budget categories and/or sub-categories, related categories, and/or related items, and the average, or otherwise weighted, amounts spent in/on each of the start-up budget categories and/or start-up budget sub-categories, related categories, and/or related items.

In one embodiment, the user is then provided with a customized start-up budget for the proposed new business via a customized start-up budget display displayed on a display device of a user computing system accessible by the user.

In one embodiment, the customized start-up budget display includes a listing of the start-up budget categories identified using the actual business start-up data associated with one or more actual businesses identified as being similar to the proposed business. In one embodiment, customized start-up budget display includes a listing of the average, or otherwise weighted, amount spent in each of the start-up budget categories, related categories, and/or related items.

In one embodiment, a user can click on, or otherwise activate, any one of the start-up budget categories and, in response, the start-up budget sub-categories, related categories, and/or related items associated with the activated start-up budget category are displayed along with a listing of the average, or otherwise weighted, amount spent in/on each of the start-up budget sub-categories.

In one embodiment, the customized start-up budget display includes a listing of the start-up budget categories identified using the actual business start-up data associated with one or more actual businesses identified as being similar to the proposed business and a graphical display of the average, or otherwise weighted, amount spent in each of the start-up budget categories.

In one embodiment, a user can click on, or otherwise activate, any one of the start-up budget categories and, in response, the start-up budget sub-categories, related categories, and/or related items associated with the activated start-up budget categories are displayed along with a graphical display of the average, or otherwise weighted, amount spent in/on each of the start-up budget sub-categories, related categories, and/or related items.

In one embodiment, the customized start-up budget display includes one or more graphical displays that are interactive and can be adjusted by the user to reflect modifications/updates of a budgeted amount in any of the start-up budget categories and start-up budget sub-categories, related categories, and/or related items based on either a user's revised/customized input or on a user's actual spending in a particular start-up budget category and start-up budget sub-categories, related categories, and/or related items.

In one embodiment, the customized start-up budget display includes total of the estimated start-up budget funds required, i.e., amount of funds required to start the business that is a summation of the average, or otherwise weighted, amount spent in each of the start-up budget categories and start-up budget sub-categories, related categories, and/or related items.

In one embodiment, the customized start-up budget display includes data entry fields associated with each start-up budget category and sub-category through which a user can enter, or modify, a budgeted amount in any of the start-up budget categories and start-up budget sub-categories, related categories, and/or related items based on either a user's revised/customized input or on a user's actual spending in a particular start-up budget category and start-up budget sub-category, related category, and/or related item. In one embodiment, as the budgeted amount in any of the start-up budget categories and start-up budget sub-categories, related categories, and/or related items is changed, or as actual funds are spent, the estimated start-up budget total, i.e., amount of funds required to start the business, is updated to reflect only the remaining funds to be spent in each of the start-up budget categories and start-up budget sub-categories, related categories, and/or related items, i.e., to show only the funds that still need to be available.

In one embodiment, when a user spends some of the budgeted money in one of the start-up budget categories and start-up budget sub-categories, related categories, and/or related items, the user is provided the opportunity to provide details of the expenditure via a record of purchase user interface. In one embodiment, the record of purchase user interface includes data fields requesting the particulars of the expenditure such as, but not limited to: the item/service purchased; the vendor used; the amount spent; any associated quantities; any user comments; and any other data desired.

In one embodiment, any changes made by the user to the budgeted amount in any of the start-up budget categories and start-up budget sub-categories, related categories, and/or related items, and/or any data provided though the record of purchase user interface, and/or the actual final numbers and categories associated with starting-up the proposed business are provided to process for providing a customized start-up budget for a new business as feedback and to add to, and/or modify, the actual business start-up data associated with one or more actual businesses in the business start-up data database. Consequently, a feedback and two-way data flow is established to ensure the actual business start-up data associated with one or more actual businesses in the business start-up data database is kept relevant and current.

In one embodiment, the customized start-up budget display also includes one or more links to other web-sites and/or databases directed to providing advice, and/or help regarding specific start-up budget categories and start-up budget sub-categories, related categories, and/or related items, or other business start-up issues. In one embodiment, the customized start-up budget display also includes one or more links to a community of users who provide their input, experience, advice, and/or help regarding specific start-up budget categories and start-up budget sub-categories, related categories, and/or related items, or other business start-up issues.

Hardware System Architecture

FIG. 1 is a block diagram of an exemplary hardware architecture for implementing one embodiment of a system and method for providing a customized start-up budget for a new business, such as exemplary process 400 (FIG. 4) discussed herein, that, returning to FIG. 1, includes: contributor financial management systems 101A to 101N; business start-up data database 121; process provider computing system 130; network 141; and user computing system 151.

In one embodiment, contributor financial management systems 101A to 101N are representative of one or more financial management systems through which actual business start-up data associated with one or more actual businesses, i.e., contributors, in one or more locations is obtained.

In various embodiments, contributor financial management systems 101A to 101N are any computing system implemented, or web-based, data management system, package, program, module, or application that gathers financial data as discussed herein, and/or as known in the art at the time of filing, and/or as developed after the time of filing.

As used herein, the term "financial management system" includes, but is not limited to, any of the following: an on-line, or web-based, or computing system implemented business financial management system, package, program, module, or application; an on-line, or web-based, or computing system implemented personal financial management system, package, program, module, or application; an on-line, or web-based, or computing system implemented business inventory system, package, program, module, or application; an on-line, or web-based, or computing system implemented business asset management system, package, program, module, or application; an on-line, or web-based, or computing system implemented personal or business accounting system, package, program, module, or application; an on-line, or web-based, or computing system implemented personal or business tax preparation system, package, program, module, or application; an on-line, or web-based, or computing system implemented healthcare management system, package, program, module, or application; or any of the numerous an on-line, or web-based, or computing system implemented financial management systems discussed herein, or known to those of skill in the art at the time of filing, or as developed after the time of filing.

Specific examples of financial management systems include, but are not limited to: Quickbooks™, available from Intuit Inc. of Mountain View, Calif.; Quickbooks On-line™, available from Intuit Inc. of Mountain View, Calif.; Mint.com™, available from Intuit Inc. of Mountain View, Calif.; Microsoft Money™, available from Microsoft, Inc. of Redmond, Wash.; Quicken™, available from Intuit Inc. of Mountain View, Calif.; Quicken Online™, available from Intuit Inc. of Mountain View, Calif.; TurboTax™ available from Intuit Inc. of Mountain View, Calif.; or various other financial management systems discussed herein, or known to those of skill in the art at the time of filing, or as developed after the time of filing.

In various embodiments, any, or all, of contributor financial management systems 101A to 101N are implemented in whole, or in part, by any computing system as defined herein and/or as known in the art at the time of filing and/or as developed thereafter, that includes components that can execute all, or part, of a financial management system and provide actual business start-up data associated with one or more actual businesses in one or more locations in accordance with at least one of the embodiments as described herein.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player or other music or video player; a server computer; an Internet appliance; or any other device that includes components that can execute all, or part, of any one of the process or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the process or operations as described herein.

Also shown in FIG. 1 is business start-up data database 121. In one embodiment, business start-up data database 121 is representative of multiple databases. In one embodiment business start-up data database 121 receives and stores actual business start-up data associated with one or more actual businesses in one or more locations from contributor financial management systems 101A to 101N via any method, apparatus, process or mechanism for transferring data from one or more devices, computing systems, server systems, databases, web site/web functions or any devices having a data storage capability to one or more other devices, computing systems, server systems, databases, web site/web functions or any devices having a data storage capability, as discussed herein, and/or as known in the art at the time of filing, and/or as thereafter developed.

In one embodiment business start-up data database 121 also receives and stores business start-up data from one or more public sources of data 131, such as census data, better business bureau data, various chambers of commerce data, professional organization data, tax records, etc In one embodiment, business start-up data database 121 is a data storage device, a designated server system or computing system, or designated portion of one or more server systems or computing systems, or distributed database, or external and/or portable hard drive. In one embodiment, business start-up data database 121 is a dedicated mass storage device implemented in software, hardware, or a combination of hardware and software. In one embodiment, business start-up data database 121 includes a web-based function.

In one embodiment, data stored, in whole, or in part, in business start-up data database 121 is used by, or is accessed by, a process for providing a customized start-up budget for a new business. In one embodiment, business start-up data database 121 is accessible by one or more users. In one embodiment, business start-up data database 121 is used, and/or accessible, by a process provider computing system, such as process provider computing system 130 (discussed below).

Also seen in FIG. 1 is process provider computing system 130. In various embodiments, process provider computing system 130 is be any computing system as defined herein and/or as known in the art at the time of filing and/or as developed thereafter, that includes components that can execute all, or part, of a process for providing a customized start-up budget for a new business in accordance with at least one of the embodiments as described herein.

In one embodiment, process provider computing system 130 is operatively coupled to start-up data database 121 to access at least part of the actual business start-up data associated with one or more actual businesses in one or more locations from contributor financial management systems 101A to 101N via any method, apparatus, process or mechanism for transferring data from one or more devices, computing systems, server systems, databases, web site/web functions or any devices having a data storage capability to one or more other devices, computing systems, server systems, databases, web site/web functions or any devices having a data storage capability, as discussed herein, and/or as known in the art at the time of filing, and/or as thereafter developed.

As seen in FIG. 1, In one embodiment, process provider computing system 130 includes a process module 251 that, as discussed below, includes procedures, data, or instructions for implementing at least part of a process for providing a customized start-up budget for a new business and communication interface 134A that includes procedures, data, or instructions, for, connecting process provider computing system 130 to a network, such as network 141 (discussed below) and/or other computing systems, such as user computing system 150, (also discussed below).

Also shown in FIG. 1 is user computing system 150. As seen in FIG. 1, user computing system 150 typically includes one or more central processing units (CPU) 151, an input/output (I/O) interface 154, and a memory 153, including cache memory 153A. In one embodiment, memory 153 includes a process module 351 that, as discussed below, includes procedures, data, or instructions for implementing at least part of a process for providing a customized start-up budget for a new business and communication interface 154A that includes procedures, data, or instructions, for, connecting user computing system 150 to a network, such as network 141 (discussed below) and/or other computing systems, such as process provider computing system 130.

As also shown in FIG. 1, user computing system 150 may further include standard user interface devices such as a keyboard 155, a mouse 157, a printer 156, and a display device 159, as well as one or more standard input/output (I/O) devices 158, such as a compact disk (CD) or Digital Video Disc (DVD) drive, floppy disk drive, or other digital or waveform port, or other device capable of inputting data to, and outputting data from, user computing system 150, whether available or known at the time of filing or as later developed.

In one embodiment, user computing system 150 also includes an Internet browser capability 152 that, in one embodiment, includes a search engine (not shown) and is stored, in whole, or in part in memory 153.

In one embodiment, user computing system 150 is used, controlled, and/or accessible by, a user of a process for providing a customized start-up budget for a new business. In various embodiments, user computing system 150 can be any computing system as defined herein and/or as known in the art at the time of filing and/or as developed thereafter, that includes components that can execute all, or part, of a process for providing a customized start-up budget for a new business in accordance with at least one of the embodiments as described herein.

Also shown in FIG. 1 is Network 130. In various embodiments, network 130 can be any network or network system as defined herein, and/or known in the art at the time of filing, and/or as developed after the time of filing, capable of allowing communication between two or more computing systems, server systems, and/or databases.

Those of skill in the art will readily recognize that the systems shown in FIG. 1, and their respective components, are shown for illustrative purposes only and that other architectures with more or fewer components can implement, and benefit from, the invention. Moreover, one or more components of user computing system 150, process provider computing system 130, contributor financial management systems 101A to 101N, and business start-up data database 121, may be located remotely from their respective system and accessed via network 130. In addition, the particular type of, and configuration of, user computing system 150, process provider computing system 130, contributor financial management systems 101A to 101N, and business start-up data database 121 are not relevant.

Figure 2:
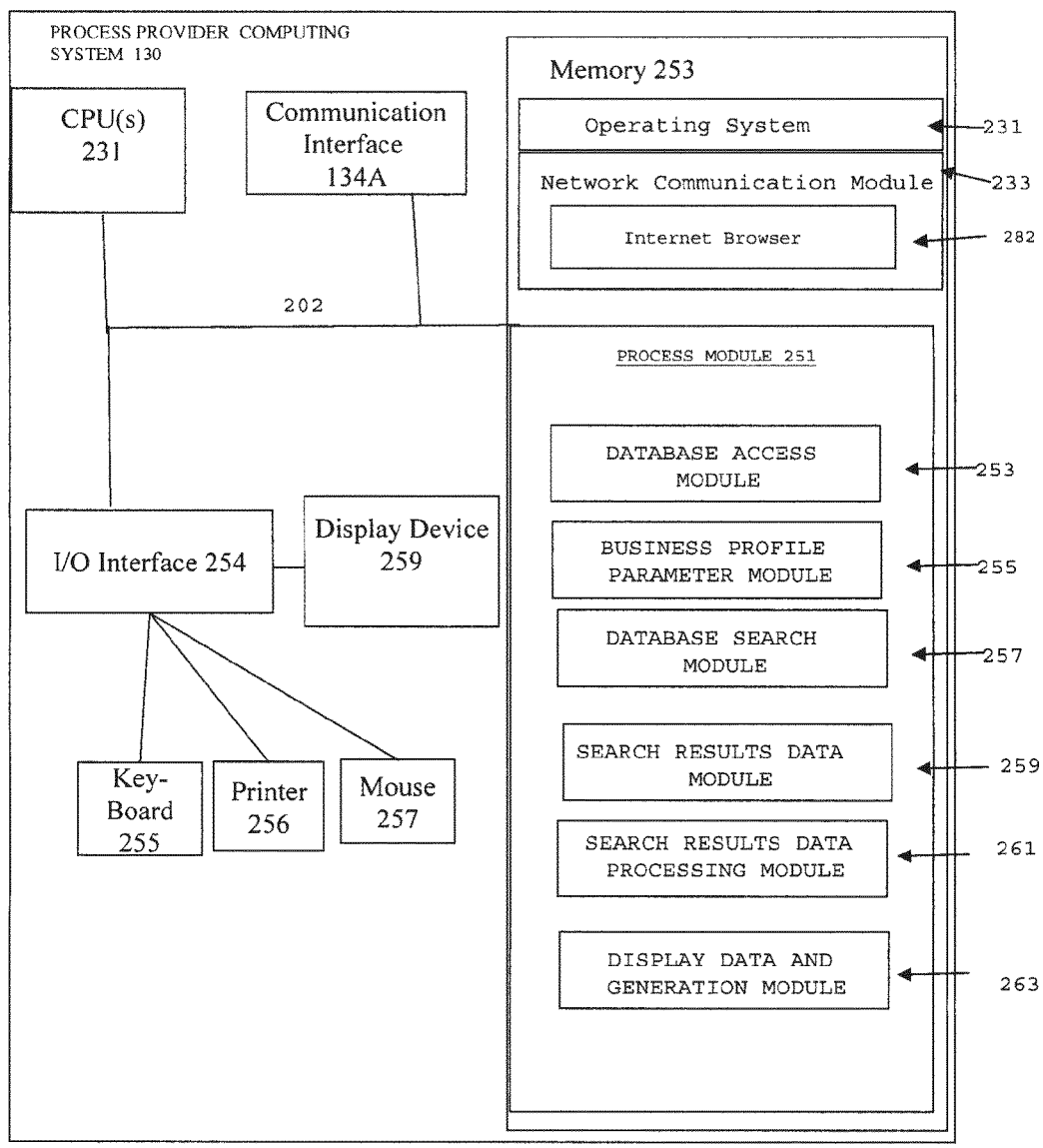
FIG. 2 is a block diagram showing more detail of an exemplary process provider computing system of FIG. 1 in accordance with one embodiment.

FIG. 2 is a block diagram showing more detail of process provider computing system 130 of FIG. 1 in accordance with one embodiment. As seen in FIG. 2, in one embodiment, process provider computing system 130 includes one or more Central Processing Unit(s), CPU(s) 231; memory 253; at least one communication interface 134A; an Input/Output interface, I/O interface 254, including one or more user interface devices such as display device 259, keyboard 255, printer 256, or mouse 257; all interconnected by one or more communication buses 202.

As also seen in FIG. 2, in one embodiment, memory 253 can store data or instructions associated with, but not limited to, the following elements, subsets of elements, or super sets of elements for processing by one or more processors, such as processors 201 and 301: operating system 231 that includes procedures, data, or instructions for handling various services and performing/coordinating hardware dependent tasks; network communications module 233 that includes procedures, data, or instructions, for, along with communication interface 134A, or Internet Browser 282, connecting process provider computing system 130 to network 141 and/or other computing systems, such as such as user computing system 150 of FIG. 1, and/or business start-up data database 121; and process module 251 that includes procedures, data, or instructions, for implementing at least part of a process for providing a customized start-up budget for a new business.

As seen in FIG. 2, process module 251 includes: database access module 253 that includes procedures, data, or instructions, for accesses a start-up data database, such as start-up data database 121 of FIG. 1; business profile parameter module 255 that includes procedures, data, or instructions, for generating and accepting input from a business profile parameter entry user interface; database search module 257 that includes procedures, data, or instructions, for searching a start-up data database, such as start-up data database 121 of FIG. 1 using the business profile parameters from business profile parameter module 255; search results data module 259 that includes procedures, data, or instructions, for storing the results data from the search of database search module 257; search results data processing module 261 that includes procedures, data, or instructions, for processing the results data from search results data module 259; and display data and generation module 263 that includes procedures, data, or instructions, for generating, displaying and updating a customized start-up budget display.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules or data shown in FIG. 2 are illustrative only and not limiting. In various other embodiments, the particular modules or data shown in FIG. 2 can be grouped together in fewer modules or data locations or divided among more modules or data locations. Consequently, those of skill in the art will recognize that other orders or grouping are possible and the particular modules or data, order, or grouping shown in FIG. 2 discussed herein do not limit the scope as claimed below.

A more detailed discussion of the operation of process provider computing system 130 and memory 253, is provided below with respect to FIGS. 4 to 9.

Figure 3:
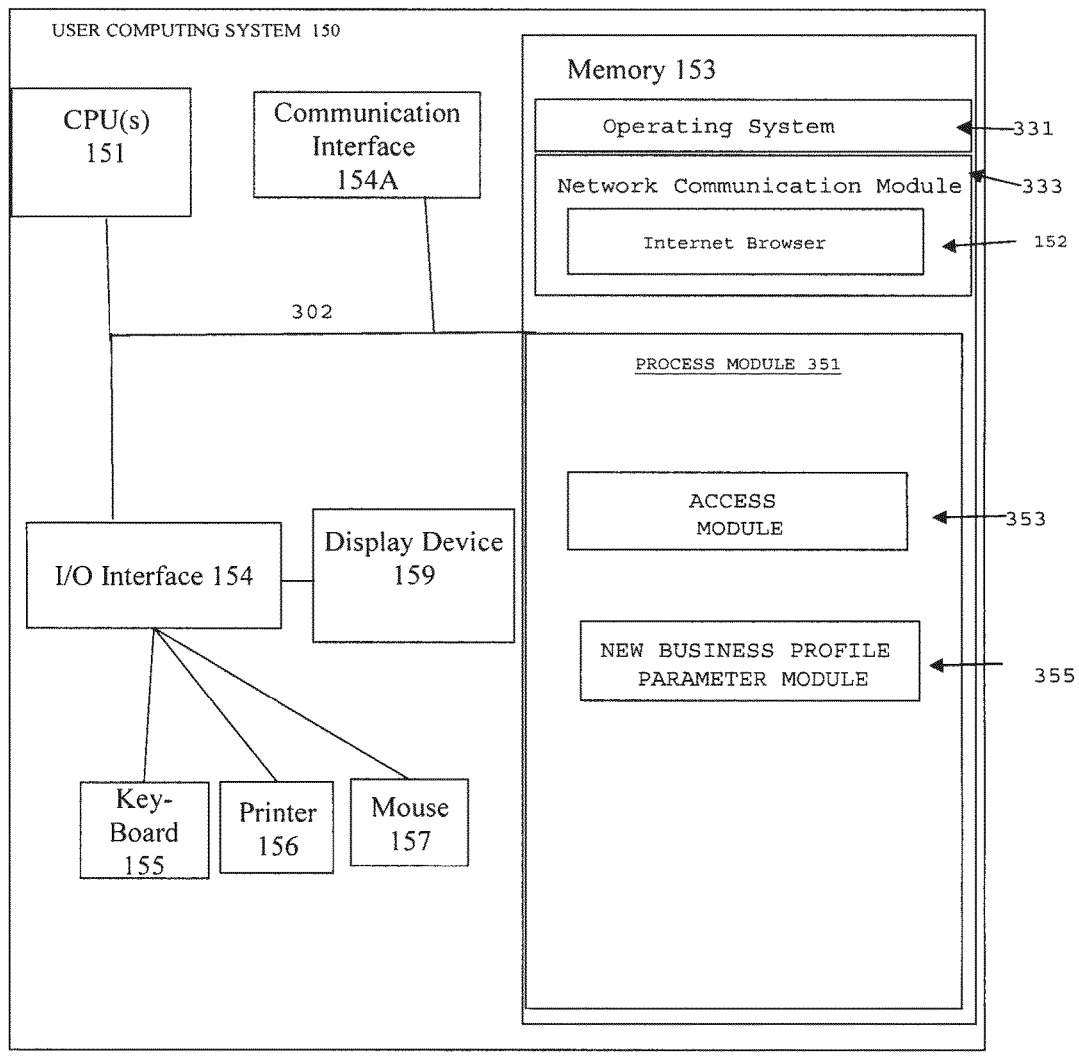
FIG. 3 is a block diagram showing more detail of an exemplary user computing system of FIG. 1 in accordance with one embodiment.

FIG. 3 is a block diagram showing more detail of user computing system 150 of FIG. 1 in accordance with one embodiment. As seen in FIG. 3, in one embodiment, user computing system 150 includes one or more Central Processing Unit(s), CPU(s) 151; memory 153; at least one communication interface 154A; an Input/Output interface, I/O interface 154, including one or more user interface devices such as display device 159, keyboard 155, printer 156, or mouse 157; all interconnected by one or more communication buses 302.

As also seen in FIG. 3, in one embodiment, memory 153 can store data or instructions associated with, but not limited to, the following elements, subsets of elements, or super sets of elements for processing by one or more processors, such as processors 201 and 301: operating system 331 that includes procedures, data, or instructions for handling various services and performing/coordinating hardware dependent tasks; network communications module 333 that includes procedures, data, or instructions, for, along with communication interface 154A, or Internet Browser 152, connecting user computing system 150 to network 141 and/or other computing systems, such as such as process provider computing system 130 of FIG. 1 and/or business start-up data database 121; and process module 351 that includes procedures, data, or instructions, for implementing at least part of a process for providing a customized start-up budget for a new business.

As seen in FIG. 3, process module 351 includes: access module 353 that includes procedures, data, or instructions, for accessing process provider computing system 130 and/or a business start-up data database, such as business start-up data database 121 of FIG. 1; new business profile parameter module 355 that includes procedures, data, or instructions, for providing input to a business profile parameter entry user interface.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules or data shown in FIG. 3 are illustrative only and not limiting. In various other embodiments, the particular modules or data shown in FIG. 3 can be grouped together in fewer modules or data locations or divided among more modules or data locations. Consequently, those of skill in the art will recognize that other orders or grouping are possible and the particular modules or data, order, or grouping shown in FIG. 3 discussed herein do not limit the scope as claimed below.

A more detailed discussion of the operation of user computing system 150 and memory 153, is provided below with respect to FIGS. 4 to 9.

Process

As used herein, the terms "user" and "potential business owner" are used interchangeably and include, but are not limited to, any person, party, business, system, application, organization, and/or entity interacting with, interfacing with, contacting, viewing, accepting data from, requesting data from, and/or otherwise associating with the process for providing a customized start-up budget for a new business for any purpose.

Herein the term "financial institution" includes, but is not limited to, any entity, party, person, application and/or system, such as, but not limited to, banks, credit card companies, asset account companies, and/or investment firms, that engages in money/asset/debt management and/or financial transaction management/recording and/or display.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "network" includes any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, known at the time of filing, or as developed thereafter.

In accordance with one embodiment, a system and method for providing a customized start-up budget for a new business leverages data collected by various financial management systems to provide a customized start-up budget for a new business. In one embodiment actual business start-up data associated with one or more actual businesses in one or more locations is obtained by the process for providing a customized start-up budget for a new business by providing the process for providing a customized start-up budget for a new business access to data from one or more financial management systems, such as one or more small business financial management systems. In one embodiment, the actual business start-up data associated with one or more actual businesses is then stripped of any identifying data and categorized according to one or more attributes or business profile parameters associated with the contributing party/business. In one embodiment, the aggregated and/or processed actual business start-up data associated with one or more actual businesses in one or more locations is then stored in a business start-up data database. In one embodiment, a business profile parameter entry user interface is provided to the user that includes one or more data entry fields where a user is requested to enter one or more business profile parameters associated with the proposed business. In one embodiment, the aggregated and/or processed actual business start-up data associated with one or more actual businesses in one or more locations stored in the business start-up data database is then searched using the business profile parameters entered by the user as search parameters to try and identify one or more businesses in the business start-up data database that are similar to the proposed business. In one embodiment, one or more businesses in the business start-up data database that are similar to the proposed business are identified and actual business start-up data associated with one or more actual businesses identified as being are similar to the proposed business is obtained from the start-up data database. In one embodiment, the actual business start-up data associated with one or more actual businesses identified as being similar to the proposed business is then used to identify one or more business start-up budget categories, and, in one embodiment, start-up budget sub-categories, related categories, and/or related items. In addition, in one embodiment the average, or otherwise weighted, amounts spent in/on each of the start-up budget categories and/or start-up budget sub-categories, related categories, and/or related items is also obtained and calculated. In one embodiment, the user is then provided with a customized start-up budget for the proposed new business that includes a listing of the start-up budget categories and/or start-up budget sub-categories, related categories, and/or related items and the average, or otherwise weighted, amounts spent in/on each of the start-up budget categories and/or start-up budget sub-categories, related categories, and/or related items.

Herein, the term "start-up budget sub-category" includes start-up budget sub-categories, related categories, and/or related items.

Figure 4:
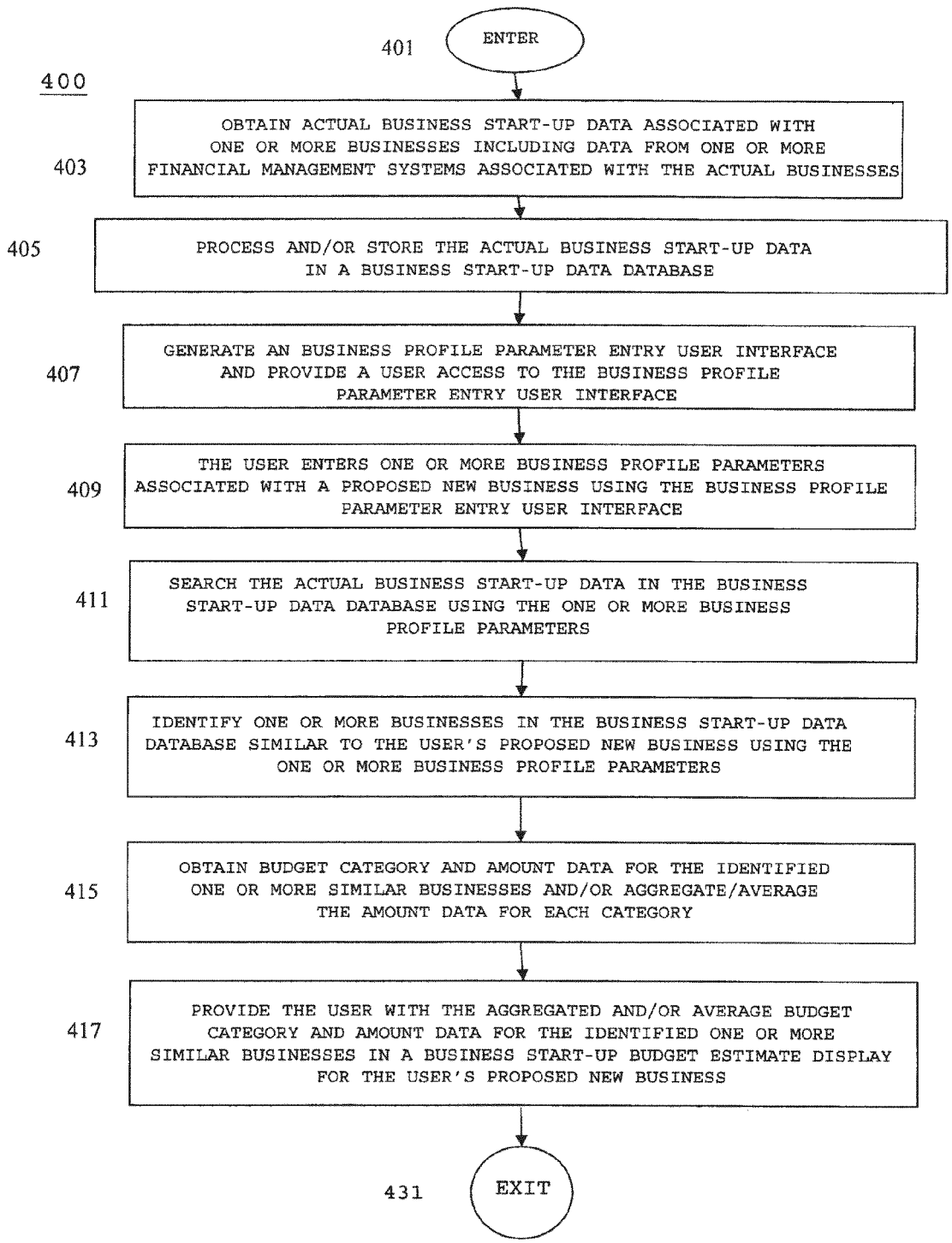
FIG. 4 is a flow chart of one example of a process for providing a customized start-up budget for a new business in accordance with one embodiment.

FIG. 4 is a flow chart depicting a process for providing a customized start-up budget for a new business 400 in accordance with one embodiment. Process for providing a customized start-up budget for a new business 400 begins at ENTER OPERATION 401 of FIG. 2 and process flow proceeds to OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403.

In one embodiment, at OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403 actual business start-up data associated with one or more actual businesses in one or more locations is obtained by process for providing a customized start-up budget for a new business 400 by providing process for providing a customized start-up budget for a new business 400 access to data from one or more financial management systems, such as contributor financial management systems 101A to 101N of FIG. 1.

As used herein, the term "financial management system" includes, but is not limited to: any computing system implemented, or web-based, data management system, package, program, module, or application that gathers financial data, including financial transactional data, or has the capability to analyze and categorize at least part of the financial data. Herein, a financial management system can be, but is not limited to, any of the following: an on-line, or web-based, or computing system implemented business financial management system, package, program, module, or application; an on-line, or web-based, or computing system implemented personal financial management system, package, program, module, or application; an on-line, or web-based, or computing system implemented business inventory system, package, program, module, or application; an on-line, or web-based, or computing system implemented business asset management system, package, program, module, or application; an on-line, or web-based, or computing system implemented personal or business accounting system, package, program, module, or application; an on-line, or web-based, or computing system implemented personal or business tax preparation system, package, program, module, or application; an on-line, or web-based, or computing system implemented healthcare management system, package, program, module, or application; or any of the numerous an on-line, or web-based, or, computing system implemented financial management systems discussed herein, or known to those of skill in the art at the time of filing, or as developed after the time of filing.

Specific examples of financial management systems include, but are not limited to: Quickbooks™, available from Intuit Inc. of Mountain View, Calif.; Quickbooks On-line™, available from Intuit Inc. of Mountain View, Calif.; Mint.com™, available from Intuit Inc. of Mountain View, Calif.; Microsoft Money™, available from Microsoft, Inc. of Redmond, Wash.; Quicken™, available from Intuit Inc. of Mountain View, Calif.; Quicken Online™, available from Intuit Inc. of Mountain View, Calif.; TurboTax™ available from Intuit Inc. of Mountain View, Calif.; or various other financial management systems discussed herein, or known to those of skill in the art at the time of filing, or as developed after the time of filing.

Financial management systems are typically software or web-based applications which, along with a computing system or device, help users/businesses manage their finances by providing a centralized interface with banks, credit card companies, asset account providers, mortgage companies, retirement account providers, vendors, government agencies, and other various financial and asset management institutions or accounts, for identifying, processing, storing, and categorizing data associated with user financial and/or business transactions. Financial management systems typically obtain financial and/or business transaction data, such as payee identification, payee location, payment amount, date of the transaction, time of transaction, etc., via communication with banks, credit card providers, or other financial institutions, using data entry, links to databases, and electronic data transfer systems such as the Open Financial Exchange (OFX) specification or various systems for transferring financial transaction data.

Using financial management systems, the financial transaction data, payee identification, payee location, payment amount, date of the transaction, various tags or labels, and other data is often used by the financial management system to categorize or tag individual financial transactions as a particular type of income or expense, to generate various financial reports, and to create an overview of the individual's financial situation based on input from multiple, and often all, available sources of financial information regarding a user. Some currently offered financial management systems then use this financial transaction data to track events, such as purchase events, and to provide various historical personal and business data reports or displays including "to date" data reports, such as historical spending data reports in one or more particular categories or tagging schemes, as well as year-end personal and business tax, or asset, or general financial reports.

In addition, some financial management systems provide a user/business with various budgeting capabilities, i.e., the capability to create and track spending in various categories and progress towards various budgeted amounts in various budget categories.

In one embodiment, access to actual business start-up data associated with one or more actual businesses in one or more locations is provided to process for providing a customized start-up budget for a new business 400 at OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403 by providing process for providing a customized start-up budget for a new business 400 access to one or more business data databases created by and/or using data from one or more financial management systems. Many financial management systems, and, in particular, business financial data management systems include, and/or have access to, tax and cost of operations data associated with numerous businesses of various types, some of which would often share common attributes with the proposed business.

Returning to FIG. 4, in one embodiment, access to actual business start-up data associated with one or more actual businesses in one or more locations is provided to process for providing a customized start-up budget for a new business 400 at OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403 by providing process for providing a customized start-up budget for a new business 400 access to data from one or more financial management systems, such as one or more small business financial management systems, via a network such as network 141 of FIG. 1 and/or any network discussed herein, and/or known in the art at the time of filing, and/or as developed after the time of filing.

Returning to FIG. 4, in one embodiment, access to actual business start-up data associated with one or more actual businesses in one or more locations is provided to process for providing a customized start-up budget for a new business 400 at OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403 by providing process for providing a customized start-up budget for a new business 400 access to data from one or more financial management systems, such as one or more small business financial management systems, via any other database, such as those discussed herein, and/or known in the art at the time of filing, and/or as developed after the time of filing.

In one embodiment, access to actual business start-up data associated with one or more actual businesses in one or more locations is provided to process for providing a customized start-up budget for a new business 400 at OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403 by providing process for providing a customized start-up budget for a new business 400 access to data from one or more financial management systems, such as one or more small business financial management systems, via a computer program product, such as those discussed herein, and/or known in the art at the time of filing, and/or as developed after the time of filing.

In one embodiment, access to actual business start-up data associated with one or more actual businesses in one or more locations is provided to process for providing a customized start-up budget for a new business 400 at OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403 by providing process for providing a customized start-up budget for a new business 400 access to data from one or more financial management systems, such as one or more small business financial management systems, using screen scrapping technology or a similar technology, such as those discussed herein, and/or known in the art at the time of filing, and/or as developed after the time of filing.

In one embodiment, access to actual business start-up data associated with one or more actual businesses in one or more locations is provided to process for providing a customized start-up budget for a new business 400 at OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403 by providing process for providing a customized start-up budget for a new business 400 access to data from one or more financial management systems, such as one or more small business financial management systems, using any method, apparatus, process or mechanism for transferring data from one or more devices, computing systems, server systems, databases, web site/web functions or any devices having a data storage capability to one or more other devices, computing systems, server systems, databases, web site/web functions or any devices having a data storage capability, whether known at the time of filing or as thereafter developed.

In one embodiment, once actual business start-up data associated with one or more actual businesses in one or more locations is obtained by process for providing a customized start-up budget for a new business 400 by providing process for providing a customized start-up budget for a new business 400 access to data from one or more financial management systems, such as contributor financial management systems 101A to 101N of FIG. 1, at OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403, process flow proceeds to PROCESS AND/OR STORE THE ACTUAL BUSINESS START-UP DATA IN A BUSINESS START-UP DATA DATABASE OPERATION 405.

In one embodiment, at PROCESS AND/OR STORE THE ACTUAL BUSINESS START-UP DATA IN A BUSINESS START-UP DATA DATABASE OPERATION 405 the actual business start-up data associated with one or more actual businesses of OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403 is stripped of any identifying data, categorized according to one or more attributes or business profile parameters associated with the contributing party/business and then stored in a business start-up data database, such as business start-up data database 121 of FIG. 1.

Returning to FIG. 4, in one embodiment, at PROCESS AND/OR STORE THE ACTUAL BUSINESS START-UP DATA IN A BUSINESS START-UP DATA DATABASE OPERATION 405 the actual business start-up data associated with one or more actual businesses in one or more locations is aggregated from, or through, one or more financial management systems at OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403 and the aggregated actual business start-up data is then stripped of any identifying data and categorized according to one or more attributes or business profile parameters associated with the contributing party/business under the direction of one or more processors associated with one or more computing systems, such as CPU(s) 231 of process provider computing system 130 of FIGS. 1 and 2.

In one embodiment, the aggregated and processed actual business start-up data is then capable of being searched based on one or more new business profile parameters (discussed below). In one embodiment, the new business profile parameters are attributes associated with the proposed business and/or a location being sought. Therefore, as discussed below, the aggregated and processed actual business start-up data can, according to one embodiment, provide a potential business owner with actual start-up costs, and operating costs, for one or more businesses similar to the proposed business operating in a given location/region under consideration.

In one embodiment, at PROCESS AND/OR STORE THE ACTUAL BUSINESS START-UP DATA IN A BUSINESS START-UP DATA DATABASE OPERATION 405 the aggregated and/or processed actual business start-up data associated with one or more actual businesses in one or more locations is then stored in a business start-up data database, such as business start-up data database 121 of FIG. 1.

As used herein, the term "database", such as used in the term "business start-up data database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, and/or accessible by, any computing system, as defined herein, known at the time of filing, or as developed thereafter.

In one embodiment, in addition to the aggregated and/or processed actual business start-up data associated with one or more actual businesses in one or more locations, business start-up data from one or more public sources of data such as census data, better business bureau data, various chambers of commerce data, professional organization data, tax records, etc. is also included in the business start-up data database.

In one embodiment, once the actual business start-up data associated with one or more actual businesses of OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403 is stripped of any identifying data, categorized according to one or more attributes or business profile parameters associated with the contributing party/business and then stored in a business start-up data database, such as business start-up data database 121 of FIG. 1, at PROCESS AND/OR STORE THE ACTUAL BUSINESS START-UP DATA IN A BUSINESS START-UP DATA DATABASE OPERATION 405, process flow proceeds to GENERATE A BUSINESS PROFILE PARAMETER ENTRY USER INTERFACE AND PROVIDE A USER ACCESS TO THE BUSINESS PROFILE PARAMETER ENTRY USER INTERFACE OPERATION 407.

In one embodiment, at GENERATE A BUSINESS PROFILE PARAMETER ENTRY USER INTERFACE AND PROVIDE A USER ACCESS TO THE BUSINESS PROFILE PARAMETER ENTRY USER INTERFACE OPERATION 407 a business profile parameter entry user interface is provided to a potential business owner/user, herein also referred to as a user, that includes one or more data entry fields where the user is requested to enter one or more business profile parameters associated with the proposed business.

In one embodiment, at GENERATE A BUSINESS PROFILE PARAMETER ENTRY USER INTERFACE AND PROVIDE A USER ACCESS TO THE BUSINESS PROFILE PARAMETER ENTRY USER INTERFACE OPERATION 407 process for providing a customized start-up budget for a new business 400 generates a business profile parameter entry user interface under the direction of one or more processors associated with one or more computing systems, such as CPU(s) 231 of process provider computing system 130 of FIGS. 1 and 2, and displays the business profile parameter entry user interface to the user on a display device, such as display device 159 of FIGS. 1 and 3, associated with a user computing system, such as user computing system 150 of FIGS. 1 and 3, that is under the control or, or accessible by, the user.

In one embodiment, the business profile parameter entry user interface of GENERATE A BUSINESS PROFILE PARAMETER ENTRY USER INTERFACE AND PROVIDE A USER ACCESS TO THE BUSINESS PROFILE PARAMETER ENTRY USER INTERFACE OPERATION 407 includes one or more data entry fields where a user is requested to enter one or more business profile parameters associated with the proposed business. In one embodiment, the one or more business profile parameters associated with the proposed business can include, but are not limited to, any one or more of: the industry associated with the proposed business; a business category associated with proposed business; a business sub-category associated with the proposed business; the number of employees initially contemplated for the proposed business; expected tax and/or management structure of the proposed business, such as, but not limited to, S-corp, sole proprietorship, L.L.C., L.L.P., stock ownership, etc.; a zip code associated with the proposed business; a telephone area code associated with the proposed business; a telephone prefix associated with the proposed business; an actual address associated with the proposed business; a specific town, village or locality contemplated for the proposed business; a specific city and/or metropolitan region contemplated for the proposed business; specific counties and/or regions contemplated for the proposed business; specific states contemplated for the proposed business; specific countries contemplated for the proposed business; specific global regions, such as Europe or Asia contemplated for the proposed business; any other geographic region/location contemplated for the proposed business such as a specific GPS coordinate; and/or virtually any other business profile parameter desired by the provider of process for providing a customized start-up budget for a new business 400 and/or one or more users of process for providing a customized start-up budget for a new business 400.

In one embodiment, one or more of the one or more business profile parameters associated with the proposed business requested through the business profile parameter entry user interface are selected by the provider of process for providing a customized start-up budget for a new business 400 and are statically displayed to the user in the business profile parameter entry user interface.

In one embodiment, one or more of the one or more business profile parameters associated with the proposed business requested through the business profile parameter entry user interface are selected by the provider of process for providing a customized start-up budget for a new business but can be added to, deleted, and/or modified by the user through the business profile parameter entry user interface.

Figure 5:
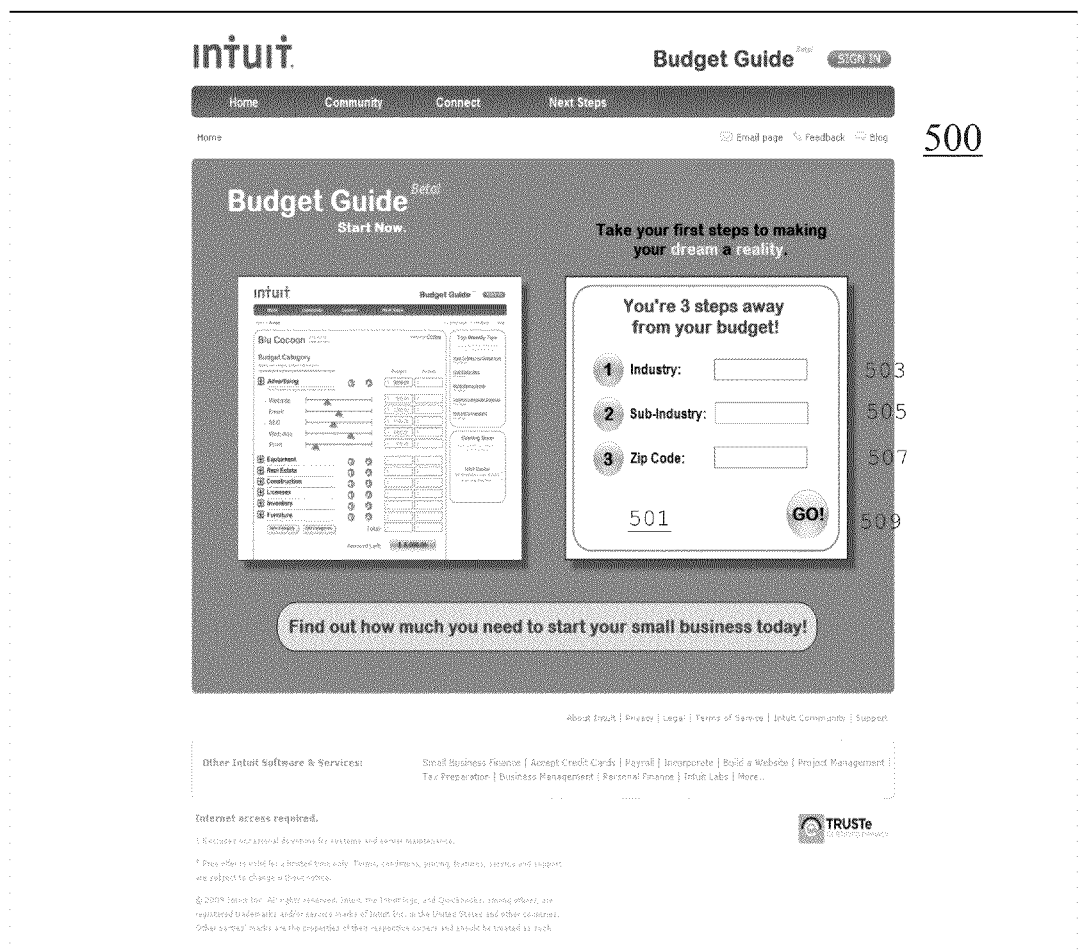
FIG. 5 is an illustrative example of a business profile parameter entry user interface screen in accordance with one embodiment.

FIG. 5 is an illustrative example of a business profile parameter entry user interface screen 500 in accordance with one embodiment.

As seen in FIG. 5, business profile parameter entry user interface screen 500 includes, business profile parameter entry user interface display 501 that includes data entry fields 503, 505, and 507, as well as activation/submission icon "Go" 509.

As seen in FIG. 5, data entry field 503 requests the user to enter data indicating the industry of the proposed business. For instance, as a specific illustrative example, the industry may be food service or restaurant. As seen in FIG. 5, data entry field 505 requests the user to enter data indicating the sub-industry of the proposed business. For instance, continuing with the specific illustrative example above, the sub-industry may be a dine-in Italian restaurant. As seen in FIG. 5, data entry field 507 requests the user to enter data indicating the zip code of the contemplated location of the proposed business. For instance, continuing with the specific illustrative example above, the zip code may be 93940 indicating Monterey, Calif.

In one embodiment, once a business profile parameter entry user interface is provided to the user that includes one or more data entry fields where the user is requested to enter one or more business profile parameters associated with the proposed business at GENERATE A BUSINESS PROFILE PARAMETER ENTRY USER INTERFACE AND PROVIDE A USER ACCESS TO THE BUSINESS PROFILE PARAMETER ENTRY USER INTERFACE OPERATION 407, process flow proceeds to THE USER ENTERS ONE OR MORE BUSINESS PROFILE PARAMETERS ASSOCIATED WITH A PROPOSED NEW BUSINESS USING THE BUSINESS PROFILE PARAMETER ENTRY USER INTERFACE OPERATION 409.

In one embodiment, at THE USER ENTERS ONE OR MORE BUSINESS PROFILE PARAMETERS ASSOCIATED WITH A PROPOSED NEW BUSINESS USING THE BUSINESS PROFILE PARAMETER ENTRY USER INTERFACE OPERATION 409 the user enters the requested one or more business profile parameters associated with the proposed business into one or more data entry fields of the business profile parameter entry user interface of GENERATE A BUSINESS PROFILE PARAMETER ENTRY USER INTERFACE AND PROVIDE A USER ACCESS TO THE BUSINESS PROFILE PARAMETER ENTRY USER INTERFACE OPERATION 407 and submits the data.

In one embodiment, at THE USER ENTERS ONE OR MORE BUSINESS PROFILE PARAMETERS ASSOCIATED WITH A PROPOSED NEW BUSINESS USING THE BUSINESS PROFILE PARAMETER ENTRY USER INTERFACE OPERATION 409 the user fills out, or otherwise enters, the requested one or more business profile parameters associated with the proposed business data into the one or more data entry fields of the business profile parameter entry user interface using a user interface device such as, but not limited to, a keyboard, mouse, voice recognition system, touch screen, touch pad, or any other device and/or mechanism capable of providing user input to a computing system, or for translating user actions into computing system operations, whether available or known at the time of filing or as developed later.

In one embodiment, at THE USER ENTERS ONE OR MORE BUSINESS PROFILE PARAMETERS ASSOCIATED WITH A PROPOSED NEW BUSINESS USING THE BUSINESS PROFILE PARAMETER ENTRY USER INTERFACE OPERATION 409 the user is given the option to provide as few, or as many, of the requested one or more business profile parameters associated with the proposed business data as he or she desires, realizing that the more detail provided, the more accurate the information returned. However, by providing the user this flexibility, the user is allowed to choose how much effort they want to put into a potentially exploratory exercise.

In one embodiment, once the user fills out, or otherwise enters, the requested one or more business profile parameters associated with the proposed business data into the one or more data entry fields of the business profile parameter entry user interface at THE USER ENTERS ONE OR MORE BUSINESS PROFILE PARAMETERS ASSOCIATED WITH A PROPOSED NEW BUSINESS USING THE BUSINESS PROFILE PARAMETER ENTRY USER INTERFACE OPERATION 409 the user activates activation/submission icon "Go" 509 of business profile parameter entry user interface display 501 of business profile parameter entry user interface screen 500 of FIG. 5.

Returning to FIG. 4, in one embodiment, once the user enters the requested one or more business profile parameters associated with the proposed business into one or more data entry fields of the business profile parameter entry user interface of GENERATE A BUSINESS PROFILE PARAMETER ENTRY USER INTERFACE AND PROVIDE A USER ACCESS TO THE BUSINESS PROFILE PARAMETER ENTRY USER INTERFACE OPERATION 407 and submits the data at THE USER ENTERS ONE OR MORE BUSINESS PROFILE PARAMETERS ASSOCIATED WITH A PROPOSED NEW BUSINESS USING THE BUSINESS PROFILE PARAMETER ENTRY USER INTERFACE OPERATION 409, process flow proceeds to SEARCH THE ACTUAL BUSINESS START-UP DATA IN THE BUSINESS START-UP DATA DATABASE USING THE ONE OR MORE BUSINESS PROFILE PARAMETERS OPERATION 411.

In one embodiment, at SEARCH THE ACTUAL BUSINESS START-UP DATA IN THE BUSINESS START-UP DATA DATABASE USING THE ONE OR MORE BUSINESS PROFILE PARAMETERS OPERATION 411 the aggregated and/or processed actual business start-up data associated with one or more actual businesses in one or more locations of OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403 stored in the business start-up data database of PROCESS AND/OR STORE THE ACTUAL BUSINESS START-UP DATA IN A BUSINESS START-UP DATA DATABASE OPERATION 405 is searched using the business profile parameters entered by the user at THE USER ENTERS ONE OR MORE BUSINESS PROFILE PARAMETERS ASSOCIATED WITH A PROPOSED NEW BUSINESS USING THE BUSINESS PROFILE PARAMETER ENTRY USER INTERFACE OPERATION 409 as search parameters to try and identify one or more businesses in the business start-up data database that are similar to the proposed business.

In one embodiment, at SEARCH THE ACTUAL BUSINESS START-UP DATA IN THE BUSINESS START-UP DATA DATABASE USING THE ONE OR MORE BUSINESS PROFILE PARAMETERS OPERATION 411 the aggregated and/or processed actual business start-up data associated with one or more actual businesses in one or more locations stored in the business start-up data database is searched using the business profile parameters entered by the user as search parameters to try and identify one or more businesses in the business start-up data database that are similar to the proposed business under the direction of one or more processors associated with one or more computing systems, such as CPU(s) 231 of process provider computing system 130 of FIGS. 1 and 2.

Returning to FIG. 4, in one embodiment, at SEARCH THE ACTUAL BUSINESS START-UP DATA IN THE BUSINESS START-UP DATA DATABASE USING THE ONE OR MORE BUSINESS PROFILE PARAMETERS OPERATION 411 the aggregated and/or processed actual business start-up data associated with one or more actual businesses in one or more locations stored in the business start-up data database is searched using the business profile parameters entered by the user to try and identify one or more businesses in the business start-up data database that are similar to the proposed business and are successful, i.e., are making a profit and/or have been up and running for a defined period of time, such as 5 years. In this way, data associated with failed businesses is not considered.

In one embodiment, at SEARCH THE ACTUAL BUSINESS START-UP DATA IN THE BUSINESS START-UP DATA DATABASE USING THE ONE OR MORE BUSINESS PROFILE PARAMETERS OPERATION 411 the aggregated and/or processed actual business start-up data associated with one or more actual businesses in one or more locations stored in the business start-up data database is searched using the business profile parameters entered by the user to try and identify one or more businesses in the business start-up data database that are similar to the proposed business and that were started-up within defined period of time, such as 10 years. In this way, data associated with older, less relevant businesses, is not considered.

In one embodiment, at SEARCH THE ACTUAL BUSINESS START-UP DATA IN THE BUSINESS START-UP DATA DATABASE USING THE ONE OR MORE BUSINESS PROFILE PARAMETERS OPERATION 411 the aggregated and/or processed actual business start-up data associated with one or more actual businesses in one or more locations stored in the business start-up data database is searched using the business profile parameters entered by the user to try and identify one or more businesses in the business start-up data database that are similar to the proposed business and using one or more other filters as defined by the provider of process for providing a customized start-up budget for a new business 400 and/or one or more users.

In one embodiment, once the aggregated and/or processed actual business start-up data associated with one or more actual businesses in one or more locations of OBTAIN ACTUAL BUSINESS START-UP DATA ASSOCIATED WITH ONE OR MORE BUSINESSES INCLUDING DATA FROM ONE OR MORE FINANCIAL MANAGEMENT SYSTEMS ASSOCIATED WITH THE ACTUAL BUSINESSES OPERATION 403 in the business start-up data database of PROCESS AND/OR STORE THE ACTUAL BUSINESS START-UP DATA IN A BUSINESS START-UP DATA DATABASE OPERATION 405 is searched using the business profile parameters entered by the user at THE USER ENTERS ONE OR MORE BUSINESS PROFILE PARAMETERS ASSOCIATED WITH A PROPOSED NEW BUSINESS USING THE BUSINESS PROFILE PARAMETER ENTRY USER INTERFACE OPERATION 409 as search parameters to try and identify one or more businesses in the business start-up data database that are similar to the proposed business at SEARCH THE ACTUAL BUSINESS START-UP DATA IN THE BUSINESS START-UP DATA DATABASE USING THE ONE OR MORE BUSINESS PROFILE PARAMETERS OPERATION 411, process flow proceeds to IDENTIFY ONE OR MORE BUSINESSES IN THE BUSINESS START-UP DATA DATABASE SIMILAR TO THE USER'S PROPOSED NEW BUSINESS USING THE ONE OR MORE BUSINESS PROFILE PARAMETERS OPERATION 413.

In one embodiment, at IDENTIFY ONE OR MORE BUSINESSES IN THE BUSINESS START-UP DATA DATABASE SIMILAR TO THE USER'S PROPOSED NEW BUSINESS USING THE ONE OR MORE BUSINESS PROFILE PARAMETERS OPERATION 413 one or more businesses in the business start-up data database that are similar to the proposed business are identified as a result of the search of SEARCH THE ACTUAL BUSINESS START-UP DATA IN THE BUSINESS START-UP DATA DATABASE USING THE ONE OR MORE BUSINESS PROFILE PARAMETERS OPERATION 411.

In one embodiment, at IDENTIFY ONE OR MORE BUSINESSES IN THE BUSINESS START-UP DATA DATABASE SIMILAR TO THE USER'S PROPOSED NEW BUSINESS USING THE ONE OR MORE BUSINESS PROFILE PARAMETERS OPERATION 413 one or more businesses in the business start-up data database that are similar to the proposed business are identified under the direction of one or more processors associated with one or more computing systems, such as CPU(s) 231 of process provider computing system 130 of FIGS. 1 and 2.

Returning to FIG. 4, in one embodiment, once one or more businesses in the business start-up data database that are similar to the proposed business are identified as a result of the search of SEARCH THE ACTUAL BUSINESS START-UP DATA IN THE BUSINESS START-UP DATA DATABASE USING THE ONE OR MORE BUSINESS PROFILE PARAMETERS OPERATION 411 at IDENTIFY ONE OR MORE BUSINESSES IN THE BUSINESS START-UP DATA DATABASE SIMILAR TO THE USER'S PROPOSED NEW BUSINESS USING THE ONE OR MORE BUSINESS PROFILE PARAMETERS OPERATION 413, process flow proceeds to OBTAIN BUDGET CATEGORY AND AMOUNT DATA FOR THE IDENTIFIED ONE OR MORE SIMILAR BUSINESSES AND/OR AGGREGATE/AVERAGE THE AMOUNT DATA FOR EACH CATEGORY OPERATION 415.

In one embodiment, at OBTAIN BUDGET CATEGORY AND AMOUNT DATA FOR THE IDENTIFIED ONE OR MORE SIMILAR BUSINESSES AND/OR AGGREGATE/AVERAGE THE AMOUNT DATA FOR EACH CATEGORY OPERATION 415: actual business start-up data associated with one or more actual businesses identified as being are similar to the proposed business of IDENTIFY ONE OR MORE BUSINESSES IN THE BUSINESS START-UP DATA DATABASE SIMILAR TO THE USER'S PROPOSED NEW BUSINESS USING THE ONE OR MORE BUSINESS PROFILE PARAMETERS OPERATION 413 is obtained from the start-up data database of PROCESS AND/OR STORE THE ACTUAL BUSINESS START-UP DATA IN A BUSINESS START-UP DATA DATABASE OPERATION 405; and the actual business start-up data associated with one or more actual businesses identified as being similar to the proposed business is processed to identify one or more business start-up budget categories, and, in one embodiment, sub-categories; and the average, or otherwise weighted, amounts spent in each of the start-up budget categories and/or sub-categories is calculated.

In one embodiment, at OBTAIN BUDGET CATEGORY AND AMOUNT DATA FOR THE IDENTIFIED ONE OR MORE SIMILAR BUSINESSES AND/OR AGGREGATE/AVERAGE THE AMOUNT DATA FOR EACH CATEGORY OPERATION 415 the actual business start-up data associated with one or more actual businesses identified as being are similar to the proposed business is obtained from the start-up data database and processed under the direction of one or more processors associated with one or more computing systems, such as CPU(s) 231 of process provider computing system 130 of FIGS. 1 and 2.

Returning to FIG. 4, in one embodiment, at OBTAIN BUDGET CATEGORY AND AMOUNT DATA FOR THE IDENTIFIED ONE OR MORE SIMILAR BUSINESSES AND/OR AGGREGATE/AVERAGE THE AMOUNT DATA FOR EACH CATEGORY OPERATION 415 the actual business start-up data associated with one or more actual businesses identified as being similar to the proposed business is then used to identify one or more business start-up budget categories, and, in one embodiment, sub-categories under the direction of one or more processors associated with one or more computing systems, such as CPU(s) 231 of process provider computing system 130 of FIGS. 1 and 2 and using various criteria such as identifying the business start-up budget categories and/or start-up budget sub-categories of most significance in terms of amount spent, frequency of occurrence in the actual business start-up data, or specific relevance to the proposed business.

Returning to FIG. 4, in one embodiment, at OBTAIN BUDGET CATEGORY AND AMOUNT DATA FOR THE IDENTIFIED ONE OR MORE SIMILAR BUSINESSES AND/OR AGGREGATE/AVERAGE THE AMOUNT DATA FOR EACH CATEGORY OPERATION 415 the actual business start-up data associated with one or more actual businesses identified as being similar to the proposed business is then used to identify and calculate the average, or otherwise weighted, amounts spent in each of the one or more business start-up budget categories and/or sub-categories identified under the direction of one or more processors associated with one or more computing systems, such as CPU(s) 231 of process provider computing system 130 of FIGS. 1 and 2.

In one embodiment, once: actual business start-up data associated with one or more actual businesses identified as being are similar to the proposed business of IDENTIFY ONE OR MORE BUSINESSES IN THE BUSINESS START-UP DATA DATABASE SIMILAR TO THE USER'S PROPOSED NEW BUSINESS USING THE ONE OR MORE BUSINESS PROFILE PARAMETERS OPERATION 413 is obtained from the start-up data database of PROCESS AND/OR STORE THE ACTUAL BUSINESS START-UP DATA IN A BUSINESS START-UP DATA DATABASE OPERATION 405; and the actual business start-up data associated with one or more actual businesses identified as being similar to the proposed business is processed to identify one or more business start-up budget categories, and, in one embodiment, sub-categories; and the average, or otherwise weighted, amounts spent in each of the start-up budget categories and/or sub-categories is calculated at OBTAIN BUDGET CATEGORY AND AMOUNT DATA FOR THE IDENTIFIED ONE OR MORE SIMILAR BUSINESSES AND/OR AGGREGATE/AVERAGE THE AMOUNT DATA FOR EACH CATEGORY OPERATION 415, process flow proceeds to PROVIDE THE USER WITH THE AGGREGATED AND/OR AVERAGE BUDGET CATEGORY AND AMOUNT DATA FOR THE IDENTIFIED ONE OR MORE SIMILAR BUSINESSES IN A BUSINESS START-UP BUDGET ESTIMATE DISPLAY FOR THE USER'S PROPOSED NEW BUSINESS OPERATION 415.

In one embodiment, at PROVIDE THE USER WITH THE AGGREGATED AND/OR AVERAGE BUDGET CATEGORY AND AMOUNT DATA FOR THE IDENTIFIED ONE OR MORE SIMILAR BUSINESSES IN A BUSINESS START-UP BUDGET ESTIMATE DISPLAY FOR THE USER'S PROPOSED NEW BUSINESS OPERATION 415 the user is provided with a customized start-up budget for the proposed new business that includes a listing of the start-up budget categories and/or sub-categories and the average, or otherwise weighted, amounts spent in each of the start-up budget categories and/or start-up budget sub-categories of OBTAIN BUDGET CATEGORY AND AMOUNT DATA FOR THE IDENTIFIED ONE OR MORE SIMILAR BUSINESSES AND/OR AGGREGATE/AVERAGE THE AMOUNT DATA FOR EACH CATEGORY OPERATION 415.

In one embodiment at PROVIDE THE USER WITH THE AGGREGATED AND/OR AVERAGE BUDGET CATEGORY AND AMOUNT DATA FOR THE IDENTIFIED ONE OR MORE SIMILAR BUSINESSES IN A BUSINESS START-UP BUDGET ESTIMATE DISPLAY FOR THE USER'S PROPOSED NEW BUSINESS OPERATION 415 the user is provided with a customized start-up budget for the proposed new business that includes a listing of the start-up budget categories and/or sub-categories and the average, or otherwise weighted, amounts spent in each of the start-up budget categories and/or start-up budget sub-categories in the form of a customized start-up budget display displayed on a display device such as display device 159 of FIGS. 1 and 3, associated with a user computing system, such as user computing system 150 of FIGS. 1 and 3, that is under the control or, or accessible by, the user.

In one embodiment at PROVIDE THE USER WITH THE AGGREGATED AND/OR AVERAGE BUDGET CATEGORY AND AMOUNT DATA FOR THE IDENTIFIED ONE OR MORE SIMILAR BUSINESSES IN A BUSINESS START-UP BUDGET ESTIMATE DISPLAY FOR THE USER'S PROPOSED NEW BUSINESS OPERATION 415 the customized start-up budget display is provided and/or displayed to the user for comparison and/or analysis via any electronic data transfer and/or communication mechanism such as, but not limited to: networks of computing systems, as defined herein, including public networks such as the Internet; cellular networks; web-sites; e-mail; electronic attachments to e-mail; text messages; cable television, satellite television, and/or "on demand" television networks and/or services; data embedded in digital media such as DVDs, CDs, and MP3 files; data displayed in on-line digital media sites; and/or any other electronic data transfer and/or communication mechanism as discussed herein, and/or known in the art at the time of filing, and/or as developed after the time of filing.

In one embodiment at PROVIDE THE USER WITH THE AGGREGATED AND/OR AVERAGE BUDGET CATEGORY AND AMOUNT DATA FOR THE IDENTIFIED ONE OR MORE SIMILAR BUSINESSES IN A BUSINESS START-UP BUDGET ESTIMATE DISPLAY FOR THE USER'S PROPOSED NEW BUSINESS OPERATION 415 the customized start-up budget display includes a listing of the start-up budget categories identified using the actual business start-up data associated with one or more actual businesses identified as being similar to the proposed business. In one embodiment, customized start-up budget display includes a listing of the average, or otherwise weighted, amount spent in each of the start-up budget categories.

Figure 6:
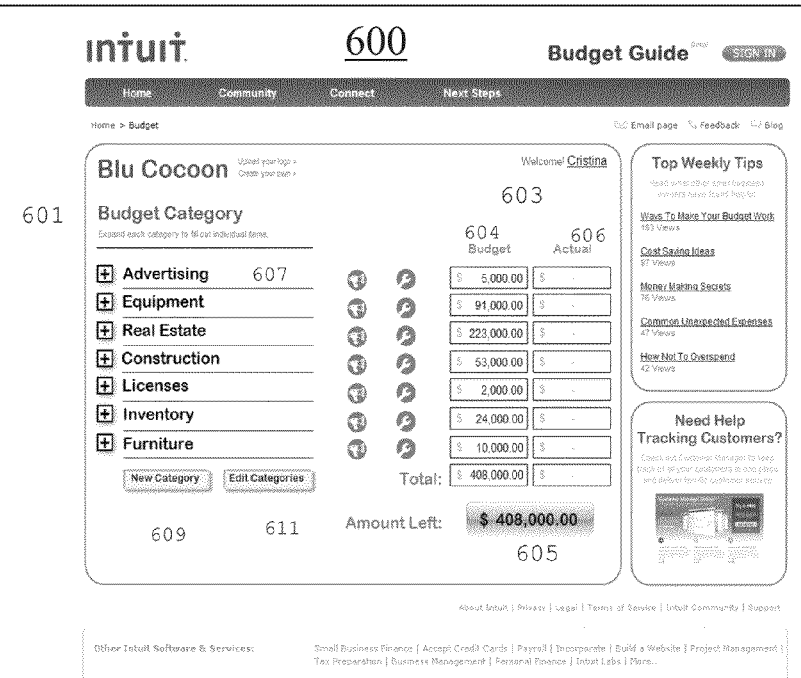
FIG. 6 is an illustrative example of a customized start-up budget display that includes a listing of the start-up budget categories in accordance with one embodiment.

FIG. 6 is an illustrative example of a customized start-up budget display 600 that includes a listing of the start-up budget categories in accordance with one embodiment. As seen in FIG. 6 customized start-up budget display 600 includes start-up budget category display 601 and start-up budget category amount display 603.

Referring to FIGS. 4 and 6 together, start-up budget category display 601 includes a category listing 607 showing the start-up budget categories identified at OBTAIN BUDGET CATEGORY AND AMOUNT DATA FOR THE IDENTIFIED ONE OR MORE SIMILAR BUSINESSES AND/OR AGGREGATE/AVERAGE THE AMOUNT DATA FOR EACH CATEGORY OPERATION 415 using the actual business start-up data associated with one or more actual businesses identified as being similar to the proposed business.

In addition, start-up budget category display 601 includes icons 609 and 611 that can be activated by the user to add a new category (icon 609) or edit a category (icon 611).

Referring again to FIGS. 4 and 6 together, start-up budget category amount display 603 includes budget data entry field column 604 and actual data entry field column 606 that include data and data entry fields corresponding to the budget categories of start-up budget category display 601. In this example, budget data entry field column 604 has been pre-populated with the average, or otherwise weighted, amounts spent in each of the one or more business start-up budget categories of start-up budget category display 601 calculated at OBTAIN BUDGET CATEGORY AND AMOUNT DATA FOR THE IDENTIFIED ONE OR MORE SIMILAR BUSINESSES AND/OR AGGREGATE/AVERAGE THE AMOUNT DATA FOR EACH CATEGORY OPERATION 415. As discussed in more detail below, actual data entry field column 606 is used to enter modified and/or actual data associated with the one or more business start-up budget categories of start-up budget category display 601.

Referring to FIG. 6, start-up budget category display 601 also includes amount left data field 605 that as discussed below, includes total of the estimated start-up budget funds required, i.e., amount of funds required to start the business, that is a summation of the average, or otherwise weighted, amount spent in each of the start-up budget categories and sub-categories of budget data entry field column 604 and/or actual data entry field column 606.

Returning to FIG. 4, in one embodiment, at PROVIDE THE USER WITH THE AGGREGATED AND/OR AVERAGE BUDGET CATEGORY AND AMOUNT DATA FOR THE IDENTIFIED ONE OR MORE SIMILAR BUSINESSES IN A BUSINESS START-UP BUDGET ESTIMATE DISPLAY FOR THE USER'S PROPOSED NEW BUSINESS OPERATION 415 using the customized start-up budget display a user can view start-up budget sub-categories associated with the any of the start-up budget categories along with a listing of the average, or otherwise weighted, amount spent in each of the start-up budget sub-categories.

In addition, in one embodiment, the customized start-up budget display includes a graphical display of the average, or otherwise weighted, amount spent in each of the start-up budget categories and/or start-up budget sub-categories.

Figure 7:
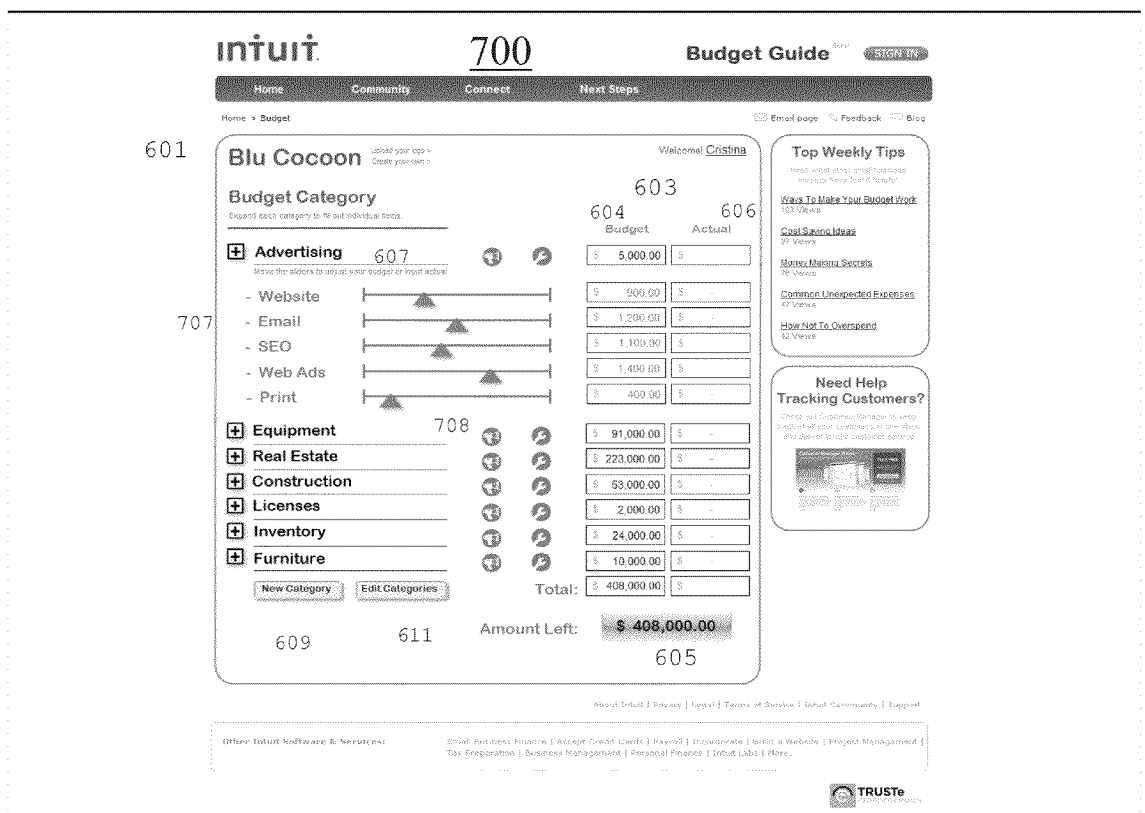
FIG. 7 is an illustrative example of a customized start-up budget display that includes a listing of the start-up budget categories and sub-categories and a graphical display of the associated budgeted amounts in accordance with one embodiment.

FIG. 7 is an illustrative example of a customized start-up budget display 700 that includes a listing of the start-up budget categories and sub-categories and a graphical display of the associated budgeted amounts in accordance with one embodiment.

As seen in FIG. 7, in one embodiment, customized start-up budget display 700 includes sub-category listing 707 associated with the parent category listing of Advertising 607 of start-up budget category display 601 that is displayed in response to the user having clicked on, or otherwise activated, the parent category listing Advertising 607. As also seen in FIG. 7, in response to the user having clicked on, or otherwise activated, the parent category listing Advertising 607 budget category amount display 603 has been updated such that budget data entry field column 604 and actual data entry field column 606 now include entry fields corresponding to the budget sub-categories 707 of start-up budget category display 601.

As also seen in FIG. 7, customized start-up budget display 700 includes a graphical display 708 showing the average, or otherwise weighted, amount spent in each of the start-up budget sub-categories 707. In one embodiment, graphical display 708 is dynamically updated and can be manipulated by the user to allow the user to adjust and reallocate budget amounts either hypothetically or in response to actual spending.

Returning to FIG. 4, in one embodiment, the customized start-up budget display of PROVIDE THE USER WITH THE AGGREGATED AND/OR AVERAGE BUDGET CATEGORY AND AMOUNT DATA FOR THE IDENTIFIED ONE OR MORE SIMILAR BUSINESSES IN A BUSINESS START-UP BUDGET ESTIMATE DISPLAY FOR THE USER'S PROPOSED NEW BUSINESS OPERATION 415 includes "actual" data entry fields associated with each start-up budget category and sub-category through which a user can enter, or modify, a budgeted amount in any of the start-up budget categories and sub-categories based on either a user's revised/customized input or on a user's actual spending in a particular start-up budget category and sub-category.

In addition, in one embodiment, the customized start-up budget display of PROVIDE THE USER WITH THE AGGREGATED AND/OR AVERAGE BUDGET CATEGORY AND AMOUNT DATA FOR THE IDENTIFIED ONE OR MORE SIMILAR BUSINESSES IN A BUSINESS START-UP BUDGET ESTIMATE DISPLAY FOR THE USER'S PROPOSED NEW BUSINESS OPERATION 415 includes a display of the total of the estimated start-up budget funds required, i.e., amount of funds required to start the business, that is a summation of the average, or otherwise weighted, amount spent in each of the start-up budget categories and sub-categories.

In one embodiment, as the budgeted amount in any of the start-up budget categories and sub-categories is changed, or as actual funds are spent, the display of the total of the estimated start-up budget funds required, i.e., amount of funds required to start the business, is updated to reflect only the remaining funds to be spent in each of the start-up budget categories and sub-categories, i.e., to show only the funds that still need to be available.

Figure 8:
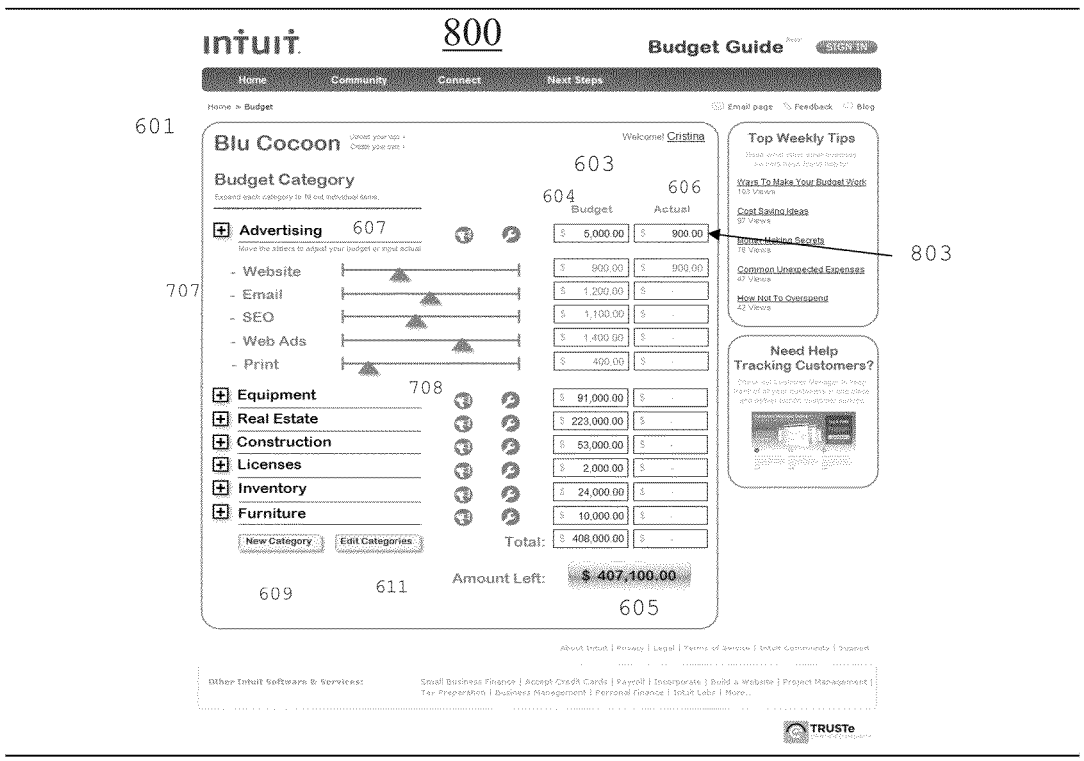
FIG. 8 is an illustrative example of a customized start-up budget display that includes an updated total of the estimated remaining start-up budget funds required.

FIG. 8 is an illustrative example of a customized start-up budget display 800 that includes an updated total of the estimated remaining start-up budget funds required 605. As seen in FIG. 8 customized start-up budget display 800 includes a modified or actual expenditure entry 803 in actual data entry field column 606 indicating, in this specific example, that $900.00 has been spent in the start-up budget sub-category "Website" of the start-up budget category "Advertising" of start-up budget category amount display 603. Consequently, in this specific example, amount left data field 605 has been updated from an amount of $408,000.00 (See FIG. 7) to an amount of $407,100.00 that reflects the remaining amount of funds required to start the business. In one embodiment, this data entry and change is also reflected in graphical display 708. In addition, as discussed below, this data entry and change is fed back to the business start-up data database to keep the data relevant and current.

Returning to FIG. 4, in one embodiment, when a user spends some of the budgeted money in one of the start-up budget categories and sub-categories, the user is provided the opportunity to provide details of the expenditure via a record of purchase user interface. In one embodiment, the record of purchase user interface includes data fields requesting the particulars of the expenditure such as, but not limited to: the item/service purchased; the vendor used; the amount spent; any associated quantities; any user comments; and any other data desired.

Figure 9:
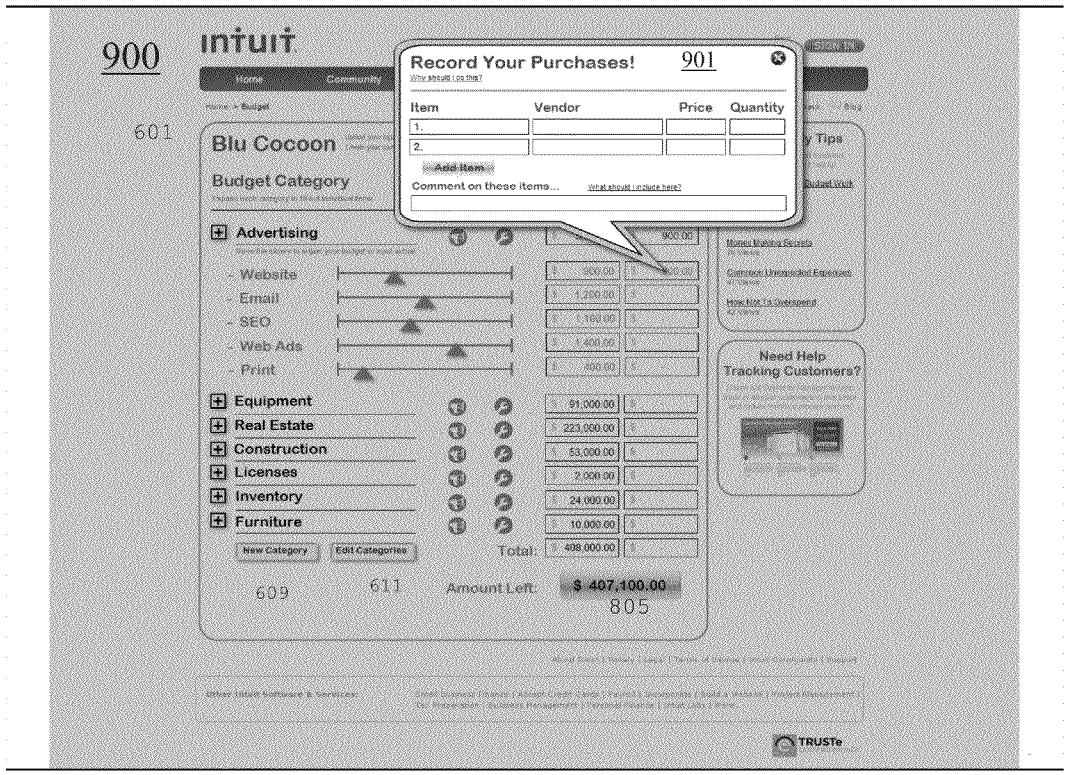
FIG. 9 is an illustrative example of a customized start-up budget display that includes a record of purchase user interface.

FIG. 9 is an illustrative example of a customized start-up budget display 900 that includes a record of purchase user interface 901. As seen in FIG. 9, record of purchase user interface 901 includes data entry fields for: the item/service purchased; the vendor used; the amount spent/price; any associated quantities; and any user comments.

In one embodiment: any changes made by the user to the budgeted amount in any of the start-up budget categories and sub-categories; and/or any data provided though the record of purchase user interface; and/or any changes made to the graphical displays; and/or the actual final numbers and categories associated with starting-up the proposed business are provided to process for providing a customized start-up budget for a new business 400 as feedback and to add to, and/or modify, the actual business start-up data associated with one or more actual businesses in the business start-up data database. Consequently, a feedback and two-way data flow is established to ensure the actual business start-up data associated with one or more actual businesses in the business start-up data database is kept relevant and current.

Returning to FIG. 4, in one embodiment, the customized start-up budget display of PROVIDE THE USER WITH THE AGGREGATED AND/OR AVERAGE BUDGET CATEGORY AND AMOUNT DATA FOR THE IDENTIFIED ONE OR MORE SIMILAR BUSINESSES IN A BUSINESS START-UP BUDGET ESTIMATE DISPLAY FOR THE USER'S PROPOSED NEW BUSINESS OPERATION 415 also includes one or more links (not shown) to other web-sites and/or databases directed to providing advice, and/or help regarding specific start-up budget categories and sub-categories, or other business start-up issues.

Returning to FIG. 4, in one embodiment, the customized start-up budget display of PROVIDE THE USER WITH THE AGGREGATED AND/OR AVERAGE BUDGET CATEGORY AND AMOUNT DATA FOR THE IDENTIFIED ONE OR MORE SIMILAR BUSINESSES IN A BUSINESS START-UP BUDGET ESTIMATE DISPLAY FOR THE USER'S PROPOSED NEW BUSINESS OPERATION 415 also includes one or more links (not shown) to a community of users who provide their input, experience, advice, and/or help regarding specific start-up budget categories and sub-categories, or other business start-up issues.

In one embodiment, once the user is provided with a customized start-up budget for the proposed new business that includes a listing of the start-up budget categories and/or sub-categories and the average, or otherwise weighted, amounts spent in each of the start-up budget categories and/or start-up budget sub-categories of OBTAIN BUDGET CATEGORY AND AMOUNT DATA FOR THE IDENTIFIED ONE OR MORE SIMILAR BUSINESSES AND/OR AGGREGATE/AVERAGE THE AMOUNT DATA FOR EACH CATEGORY OPERATION 415 at PROVIDE THE USER WITH THE AGGREGATED AND/OR AVERAGE BUDGET CATEGORY AND AMOUNT DATA FOR THE IDENTIFIED ONE OR MORE SIMILAR BUSINESSES IN A BUSINESS START-UP BUDGET ESTIMATE DISPLAY FOR THE USER'S PROPOSED NEW BUSINESS OPERATION 415, process flow proceeds to EXIT OPERATION 431.

In one embodiment, at EXIT OPERATION 431 process for providing a customized start-up budget for a new business 400 is exited to await new data.

In the discussion above, certain aspects of one embodiment include process steps or operations or instructions described herein for illustrative purposes in a particular order or grouping. However, the particular order or grouping shown and discussed herein are illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein do not limit the scope of the invention as claimed below.

As discussed above, process for providing a customized start-up budget for a new business 400 leverages actual business start-up data associated with one or more actual businesses in one or more locations collected by various financial management systems to provide a customized start-up budget for a new business that includes a listing of the start-up budget categories and/or sub-categories associated with starting up a proposed business in a particular area and the average, or otherwise weighted, amounts spent in each of the start-up budget categories and/or start-up budget sub-categories. Consequently, using process for providing a customized start-up budget for a new business 400, potential business owners do not need to rely on business start-up budget data that: is largely generalized and theoretical, i.e., is based on speculation and extrapolation rather than based on actual transactions involving actual businesses; is dated; is incomplete; includes data for both failed businesses and businesses that succeeded; and is highly regional in nature. Therefore, through process for providing a customized start-up budget for a new business 400, potential small business owners, and current small business owners, are provided a simple, effective, and efficient mechanism for obtaining business start-up budget data that is relevant to their proposed business, or existing business, and is based on the actual expenditures and experience of actual owners of similar businesses in the desired location of the proposed business, or existing business The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "associating", "analyzing", "defining", "storing", "saving", "displaying", "categorizing", "providing", "processing", "accessing", "selecting", "creating", "using", "submitting", "generating", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for providing a customized start-up budget for a new business comprising:
   one or more computing processors; and
   one or more memories coupled to the one or more computing processors, the one or more memories having stored therein computing processor executable instructions which when executed by the one or more computing processors, perform a process comprising:
   obtaining actual business start-up data associated with one or more actual businesses from one or more financial management systems associated with the one or more actual businesses;
   aggregating and processing the actual business start-up data associated with one or more actual businesses to identify business profile parameters associated with the one or more actual businesses using one or more processors associated with one or more computing systems;
   storing the aggregated and processed actual business start-up data associated with one or more actual businesses in a business start-up data database;
   obtaining data indicating one or more new business profile parameters associated with a proposed business from a user via user input into a business profile parameter entry user interface using a user interface device associated with a user computing system;
   searching the aggregated and processed actual business start-up data associated with one or more actual businesses in the business start-up data database using the one or more new business profile parameters to identify one or more businesses similar to the proposed business using one or more processors associated with one or more computing systems;
   identifying one or more businesses similar to the proposed business;

obtaining actual business start-up data associated with the identified one or more businesses similar to the proposed business from the business start-up data database;

processing the obtained actual business start-up data associated with the identified one or more businesses similar to the proposed business from the business start-up data database to identify one or more business start-up budget categories associated with starting up the proposed business using one or more processors associated with one or more computing systems;

processing the obtained actual business start-up data associated with the identified one or more businesses similar to the proposed business from the business start-up data database to calculate an estimated budget amount for the identified one or more business start-up budget categories associated with starting up the proposed business using one or more processors associated with one or more computing systems; and providing the user with a customized start-up budget for the proposed new business that includes a listing of at least some of the identified business start-up budget categories and the estimated budget amount for the at least some of the identified one or more business start-up budget categories associated with starting up the proposed business.

2. The system for providing a customized start-up budget for a new business of claim 1, wherein;

at least one of the one or more financial management systems is selected from the group of financial management systems consisting of:

an on-line, or web-based, or computing system implemented business financial management system, package, program, module, or application;

an on-line, or web-based, or computing system implemented personal financial management system, package, program, module, or application;

an on-line, or web-based, or computing system implemented business inventory system, package, program, module, or application;

an on-line, or web-based, or computing system implemented Point-Of-Sale (POS) management system, package, program, module, or application;

an on-line, or web-based, or computing system implemented business asset management system, package, program, module, or application;

an on-line, or web-based, or computing system implemented business accounting system, package, program, module, or application;

an on-line, or web-based, or computing system implemented personal accounting system, package, program, module, or application;

an on-line, or web-based, or computing system implemented business tax preparation system, package, program, module, or application; and an on-line, or web-based, or computing system implemented personal tax preparation system, package, program, module, or application.

3. The system for providing a customized start-up budget for a new business of claim 1, wherein;

at least one of the one or more business profile parameters is selected from the group of business profile parameters consisting of:

the industry associated with the business;
a business category associated with the business;
a business sub-category associated with the business;
the number of employees initially contemplated for the business;
expected tax and/or management structure of the business;
a zip code associated with the business;
a telephone area code associated with the business;
a telephone prefix associated with the business;
an actual address associated with the business;
a specific town, village or locality associated with the business;
a specific city and/or metropolitan region associated with the business;
specific counties and/or regions associated with the business;
specific states associated with the business;
specific countries associated with the business; and
the age of the business.

4. The system for providing a customized start-up budget for a new business of claim 1, wherein;

at least one of the one or more new business profile parameters is selected from the group of new business profile parameters consisting of:

the industry associated with the proposed business;
a business category associated with the proposed business;
a business sub-category associated with the proposed business;
the number of employees initially contemplated for the proposed business;
expected tax and/or management structure of the proposed business;
a zip code associated with the proposed business;
a telephone area code associated with the proposed business;
a telephone prefix associated with the proposed business;
an actual address associated with the proposed business;
a specific town, village or locality contemplated for the proposed business;
a specific city and/or metropolitan region contemplated for the proposed business;
specific counties and/or regions contemplated for the proposed business;
specific states contemplated for the proposed business; and
specific countries contemplated for the proposed business.

5. The system for providing a customized start-up budget for a new business of claim 1, wherein;

the customized start-up budget for the proposed new business includes a graphical display of the estimated budget amount for the at least some of the identified one or more business start-up budget categories.

6. The system for providing a customized start-up budget for a new business of claim 1, wherein;

the customized start-up budget for the proposed new business includes a user interactive graphical display of the estimated budget amount for the at least some of the identified one or more business start-up budget categories.

7. The system for providing a customized start-up budget for a new business of claim 1, further comprising:

providing the user with the capability to modify or update the estimated budget amount for the at least some of the identified one or more business start-up budget categories.

8. The system for providing a customized start-up budget for a new business of claim 1, further comprising:

providing the user the capability to provide feedback data to the computing system implemented process for providing a customized start-up budget for a new business to update the actual business start-up data associated in the business start-up data database based on the user's actual spending.

9. The system for providing a customized start-up budget for a new business of claim 1, further comprising:
  processing the obtained actual business start-up data associated with identified one or more businesses similar to the proposed business from the business start-up data database to identify one or more business start-up budget sub-categories associated with starting up the proposed business using one or more processors associated with one or more computing systems;
  processing the obtained actual business start-up data associated with identified one or more businesses similar to the proposed business from the business start-up data database to calculate an estimated budget amount for the identified one or more business start-up budget sub-categories associated with starting up the proposed business; and
  providing the user with a customized start-up budget for the proposed new business that includes a listing of at least some of the identified business start-up budget categories and at least some of the identified business start-up budget sub-categories and the estimated budget amount for the at least some of the identified one or more business start-up budget categories and sub-categories associated with starting up the proposed business.

10. The system for providing a customized start-up budget for a new business of claim 9, wherein;
  the customized start-up budget for the proposed new business includes a graphical display of the estimated budget amount for the at least some of the identified one or more business start-up budget sub-categories.

11. The system for providing a customized start-up budget for a new business of claim 9, wherein;
  the customized start-up budget for the proposed new business that includes a user interactive graphical display of the estimated budget amount for the at least some of the identified one or more business start-up budget sub-categories.

12. The system for providing a customized start-up budget for a new business of claim 9, further comprising:
  providing the user with the capability to modify or update the estimated budget amount for the at least some of the identified one or more business start-up budget sub-categories.

13. A system for providing a customized start-up budget for a new business comprising:
  one or more actual businesses;
  one or more actual business computing systems, the one or more actual business computing systems being associated with the one or more actual businesses one of more financial data management systems implemented by one or more processors associated with the one or more actual business computing systems, the one or more financial data management systems being associated with one or more of the one or more actual businesses;
  a user computing system;
  a business start-up data database; and
  a process provider computing system, the process provider computing system implementing at least part of a process for providing a customized start-up budget for a new business, the process for providing a customized start-up budget for a new business including:
    obtaining actual business start-up data associated with one or more actual businesses from the one or more financial management systems associated with the one or more actual businesses;
    aggregating and processing the actual business start-up data associated with one or more actual businesses to identify business profile parameters associated with the one or more actual businesses using one or more processors associated with one or more computing systems;
    storing the aggregated and processed actual business start-up data associated with one or more actual businesses in the business start-up data database;
    obtaining data indicating one or more new business profile parameters associated with a proposed business from a user via user input into a business profile parameter entry user interface using a user interface device associated with the user computing system;
    searching the aggregated and processed actual business start-up data associated with one or more actual businesses in the business start-up data database using the one or more new business profile parameters to identify one or more businesses similar to the proposed business using one or more processors associated with the process provider computing system;
    identifying one or more businesses similar to the proposed business;
    obtaining actual business start-up data associated with the identified one or more businesses similar to the proposed business from the business start-up data database;
    processing the obtained actual business start-up data associated with the identified one or more businesses similar to the proposed business from the business start-up data database to identify one or more business start-up budget categories associated with starting up the proposed business using the one or more processors associated with the process provider computing system;
    processing the obtained actual business start-up data associated with the identified one or more businesses similar to the proposed business from the business start-up data database to calculate an estimated budget amount for the identified one or more business start-up budget categories associated with starting up the proposed business using the one or more processors associated with the process provider computing system; and
    providing the user with a customized start-up budget for the proposed new business that includes a listing of at least some of the identified business start-up budget categories and the estimated budget amount for the at least some of the identified one or more business start-up budget categories associated with starting up the proposed business.

14. The system for providing a customized start-up budget for a new business of claim 13, wherein;
  at least one of the one or more financial management systems is selected from the group of financial management systems consisting of:
  an on-line, or web-based, or computing system implemented business financial management system, package, program, module, or application;
  an on-line, or web-based, or computing system implemented personal financial management system, package, program, module, or application;
  an on-line, or web-based, or computing system implemented business inventory system, package, program, module, or application;
  an on-line, or web-based, or computing system implemented Point-Of-Sale (POS) management system, package, program, module, or application;
  an on-line, or web-based, or computing system implemented business asset management system, package, program, module, or application;

an on-line, or web-based, or computing system implemented business accounting system, package, program, module, or application;

an on-line, or web-based, or computing system implemented personal accounting system, package, program, module, or application;

an on-line, or web-based, or computing system implemented business tax preparation system, package, program, module, or application; and an on-line, or web-based, or computing system implemented personal tax preparation system, package, program, module, or application.

15. The system for providing a customized start-up budget for a new business of claim 13, wherein;

at least one of the one or more business profile parameters is selected from the group of business profile parameters consisting of:

the industry associated with the business;
a business category associated with the business;
a business sub-category associated with the business;
the number of employees initially contemplated for the business;
expected tax and/or management structure of the business;
a zip code associated with the business;
a telephone area code associated with the business;
a telephone prefix associated with the business;
an actual address associated with the business;
a specific town, village or locality associated with the business;
a specific city and/or metropolitan region associated with the business;
specific counties and/or regions associated with the business;
specific states associated with the business;
specific countries associated with the business; and
the age of the business.

16. The system for providing a customized start-up budget for a new business of claim 13, wherein;

at least one of the one or more new business profile parameters is selected from the group of new business profile parameters consisting of:

the industry associated with the proposed business;
a business category associated with the proposed business;
a business sub-category associated with the proposed business;
the number of employees initially contemplated for the proposed business;
expected tax and/or management structure of the proposed business;
a zip code associated with the proposed business;
a telephone area code associated with the proposed business;
a telephone prefix associated with the proposed business;
an actual address associated with the proposed business;
a specific town, village or locality contemplated for the proposed business;
a specific city and/or metropolitan region contemplated for the proposed business;
specific counties and/or regions contemplated for the proposed business;
specific states contemplated for the proposed business; and
specific countries contemplated for the proposed business.

17. The system for providing a customized start-up budget for a new business of claim 13, wherein;

the customized start-up budget for the proposed new business includes a graphical display of the estimated budget amount for the at least some of the identified one or more business start-up budget categories.

18. The system for providing a customized start-up budget for a new business of claim 13, wherein;

the customized start-up budget for the proposed new business includes a user interactive graphical display of the estimated budget amount for the at least some of the identified one or more business start-up budget categories.

19. The system for providing a customized start-up budget for a new business of claim 13, wherein the process for providing a customized start-up budget for a new business further includes:

providing the user with the capability to modify or update the estimated budget amount for the at least some of the identified one or more business start-up budget categories.

20. The system for providing a customized start-up budget for a new business of claim 13, wherein the process for providing a customized start-up budget for a new business further includes:

providing the user the capability to provide feedback data to the computing system implemented process for providing a customized start-up budget for a new business to update the actual business start-up data associated in the business start-up data database based on the user's actual spending.

21. The system for providing a customized start-up budget for a new business of claim 13, wherein the process for providing a customized start-up budget for a new business further includes:

processing the obtained actual business start-up data associated with identified one or more businesses similar to the proposed business from the business start-up data database to identify one or more business start-up budget sub-categories associated with starting up the proposed business using one or more processors associated with one or more computing systems;

processing the obtained actual business start-up data associated with identified one or more businesses similar to the proposed business from the business start-up data database to calculate an estimated budget amount for the identified one or more business start-up budget sub-categories associated with starting up the proposed business; and providing the user with a customized start-up budget for the proposed new business that includes a listing of at least some of the identified business start-up budget categories and at least some of the identified business start-up budget sub-categories and the estimated budget amount for the at least some of the identified one or more business start-up budget categories and sub-categories associated with starting up the proposed business.

22. The system for providing a customized start-up budget for a new business of claim 21, wherein;

the customized start-up budget for the proposed new business includes a graphical display of the estimated budget amount for the at least some of the identified one or more business start-up budget sub-categories.

23. The system for providing a customized start-up budget for a new business of claim 21, wherein;

the customized start-up budget for the proposed new business that includes a user interactive graphical display of the estimated budget amount for the at least some of the identified one or more business start-up budget sub-categories.

24. The system for providing a customized start-up budget for a new business of claim 21, wherein the process for providing a customized start-up budget for a new business further includes:
  providing the user with the capability to modify or update the estimated budget amount for the at least some of the identified one or more business start-up budget sub-categories.

25. A method for providing a customized start-up budget for a new business comprising:
  Obtaining, using a computing system, actual business start-up data associated with one or more actual businesses from one or more financial management systems associated with the one or more actual businesses;
  aggregating and processing, using the computing system, the actual business start-up data associated with one or more actual businesses to identify business profile parameters associated with the one or more actual businesses;
  storing, using the computing system, the aggregated and processed actual business start-up data associated with one or more actual businesses in a business start-up data database;
  obtaining, using the computing system, data indicating one or more new business profile parameters associated with a proposed business from a user via user input into a business profile parameter entry user interface using a user interface device associated with a user computing system;
  searching, using the computing system, the aggregated and processed actual business start-up data associated with one or more actual businesses in the business start-up data database using the one or more new business profile parameters to identify one or more businesses similar to the proposed business;
  identifying, using the computing system, one or more businesses similar to the proposed business;
  obtaining, using the computing system, actual business start-up data associated with the identified one or more businesses similar to the proposed business from the business start-up data database;
  processing, using the computing system, the obtained actual business start-up data associated with the identified one or more businesses similar to the proposed business from the business start-up data database to identify one or more business start-up budget categories associated with starting up the proposed business;
  processing, using the computing system, the obtained actual business start-up data associated with the identified one or more businesses similar to the proposed business from the business start-up data database to calculate an estimated budget amount for the identified one or more business start-up budget categories associated with starting up the proposed business; and
  providing, using the computing system, the user with a customized start-up budget for the proposed new business that includes a listing of at least some of the identified business start-up budget categories and the estimated budget amount for the at least some of the identified one or more business start-up budget categories associated with starting up the proposed business.

26. The method for providing a customized start-up budget for a new business of claim 25, wherein;
  at least one of the one or more financial management systems is selected from the group of financial management systems consisting of:
    an on-line, or web-based, or computing system implemented business financial management system, package, program, module, or application;
    an on-line, or web-based, or computing system implemented personal financial management system, package, program, module, or application;
    an on-line, or web-based, or computing system implemented business inventory system, package, program, module, or application;
    an on-line, or web-based, or computing system implemented Point-Of-Sale (POS) management system, package, program, module, or application;
    an on-line, or web-based, or computing system implemented business asset management system, package, program, module, or application;
    an on-line, or web-based, or computing system implemented business accounting system, package, program, module, or application;
    an on-line, or web-based, or computing system implemented personal accounting system, package, program, module, or application;
    an on-line, or web-based, or computing system implemented business tax preparation system, package, program, module, or application; and
    an on-line, or web-based, or computing system implemented personal tax preparation system, package, program, module, or application.

27. The method for providing a customized start-up budget for a new business of claim 25, wherein;
  at least one of the one or more business profile parameters is selected from the group of business profile parameters consisting of:
  the industry associated with the business;
  a business category associated with the business;
  a business sub-category associated with the business;
  the number of employees initially contemplated for the business;
  expected tax and/or management structure of the business;
  a zip code associated with the business;
  a telephone area code associated with the business;
  a telephone prefix associated with the business;
  an actual address associated with the business;
  a specific town, village or locality associated with the business;
  a specific city and/or metropolitan region associated with the business;
  specific counties and/or regions associated with the business;
  specific states associated with the business;
  specific countries associated with the business; and
  the age of the business.

28. The method for providing a customized start-up budget for a new business of claim 25, wherein;
  at least one of the one or more new business profile parameters is selected from the group of new business profile parameters consisting of:
  the industry associated with the proposed business;
  a business category associated with the proposed business;
  a business sub-category associated with the proposed business;
  the number of employees initially contemplated for the proposed business;
  expected tax and/or management structure of the proposed business;
  a zip code associated with the proposed business;
  a telephone area code associated with the proposed business;

a telephone prefix associated with the proposed business;
an actual address associated with the proposed business;
a specific town, village or locality contemplated for the proposed business;
a specific city and/or metropolitan region contemplated for the proposed business;
specific counties and/or regions contemplated for the proposed business;
specific states contemplated for the proposed business; and
specific countries contemplated for the proposed business.

29. The method for providing a customized start-up budget for a new business of claim 25, wherein;
the customized start-up budget for the proposed new business includes a graphical display of the estimated budget amount for the at least some of the identified one or more business start-up budget categories.

30. The method for providing a customized start-up budget for a new business of claim 25, wherein;
the customized start-up budget for the proposed new business includes a user interactive graphical display of the estimated budget amount for the at least some of the identified one or more business start-up budget categories.

31. The method for providing a customized start-up budget for a new business of claim 25, further comprising:
providing, using the computing system, the user with the capability to modify or update the estimated budget amount for the at least some of the identified one or more business start-up budget categories.

32. The method for providing a customized start-up budget for a new business of claim 25, further comprising:
providing, using the computing system, the user the capability to provide feedback data to the computing system implemented process for providing a customized start-up budget for a new business to update the actual business start-up data associated in the business start-up data database based on the user's actual spending.

33. The method for providing a customized start-up budget for a new business of claim 25, further comprising:
processing, using the computing system, the obtained actual business start-up data associated with identified one or more businesses similar to the proposed business from the business start-up data database to identify one or more business start-up budget sub-categories associated with starting up the proposed business using one or more processors associated with one or more computing systems;
processing, using the computing system, the obtained actual business start-up data associated with identified one or more businesses similar to the proposed business from the business start-up data database to calculate an estimated budget amount for the identified one or more business start-up budget sub-categories associated with starting up the proposed business; and
providing, using the computing system, the user with a customized start-up budget for the proposed new business that includes a listing of at least some of the identified business start-up budget categories and at least some of the identified business start-up budget sub-categories and the estimated budget amount for the at least some of the identified one or more business start-up budget categories and sub-categories associated with starting up the proposed business.

34. The method for providing a customized start-up budget for a new business of claim 33, wherein;
the customized start-up budget for the proposed new business includes a graphical display of the estimated budget amount for the at least some of the identified one or more business start-up budget sub-categories.

35. The method for providing a customized start-up budget for a new business of claim 33, wherein;
the customized start-up budget for the proposed new business that includes a user interactive graphical display of the estimated budget amount for the at least some of the identified one or more business start-up budget sub-categories.

36. The method for providing a customized start-up budget for a new business of claim 33, further comprising:
providing the user with the capability to modify or update the estimated budget amount for the at least some of the identified one or more business start-up budget sub-categories.

\* \* \* \* \*